United States Patent
Arnitz et al.

(10) Patent No.: US 10,938,249 B2
(45) Date of Patent: Mar. 2, 2021

(54) DYNAMIC RECTIFIER CIRCUITS WITH MULTIPLE-ORDER TIMESCALE FEEDBACK CONTROLS

(71) Applicant: Searete, LLC, Bellevue, WA (US)

(72) Inventors: Daniel Arnitz, Seattle, WA (US); Lawrence F. Arnstein, Seattle, WA (US); Jeffrey A. Bowers, Bellevue, WA (US); Joseph A. Hagerty, Seattle, WA (US); Russell J. Hannigan, Sammamish, WA (US); Guy S. Lipworth, Seattle, WA (US); David R. Nash, Arlington, WA (US); Matthew S. Reynolds, Seattle, WA (US); Clarence T. Tegreene, Mercer Island, WA (US); Yaroslav A. Urzhumov, Bellevue, WA (US)

(73) Assignee: Searete LLC, Bellevue, WA (US)

(*) Notice: Subject to any disclaimer, the term of this patent is extended or adjusted under 35 U.S.C. 154(b) by 231 days.

(21) Appl. No.: 16/157,680

(22) Filed: Oct. 11, 2018

(65) Prior Publication Data

US 2020/0119591 A1    Apr. 16, 2020

(51) Int. Cl.
*H02J 50/40* (2016.01)
*H02J 50/20* (2016.01)
(Continued)

(52) U.S. Cl.
CPC .............. *H02J 50/20* (2016.02); *B60L 53/12* (2019.02); *H02J 50/40* (2016.02); *H02J 50/80* (2016.02);
(Continued)

(58) Field of Classification Search
CPC .. H02J 50/20; H02J 50/40; H02J 50/80; H02J 7/0063; H02J 7/0048; H02J 50/90;
(Continued)

(56) References Cited

U.S. PATENT DOCUMENTS

| 7,167,090 B1 * | 1/2007 | Mandal ................ H02M 7/219 340/538.14 |
| 2015/0091706 A1 | 4/2015 | Chemishkian et al. |

(Continued)

OTHER PUBLICATIONS

Arnitz, et al., Wireless Power Transfer Optimization for Nonlinear Passive Backscatter Devices, 2013 IEEE International Conference on RFID, p. 245-252, 2013.
(Continued)

*Primary Examiner* — Daniel J Cavallari
(74) *Attorney, Agent, or Firm* — Phillips Winchester; Justin K. Flanagan

(57) ABSTRACT

Systems and methods are provided for various tunable multi-timescale wireless rectification systems. Tunable multi-timescale wireless rectification systems may include multiple feedback control loops, systems, or sub-systems that modify characteristics of components of a wireless rectification system on various timescales. A wireless rectification system may include antennas, impedance-matching components, rectifying devices, DC-to-DC converters, and/or load controllers. Two or more feedback controls may function on different timescales to modify one or more characteristics or functionalities of components of the wireless rectification system in response to monitored AC and/or DC power values at various locations within the wireless rectification system. Feedback controls operating on various timescales may include antenna feedback controls, impedance feedback controls, rectifying feedback controls, and/or DC feedback controls.

33 Claims, 21 Drawing Sheets

(51) Int. Cl.
*B60L 53/12* (2019.01)
*H02J 50/80* (2016.01)

(52) U.S. Cl.
CPC ....... *B60L 2200/10* (2013.01); *B60L 2210/10* (2013.01)

(58) Field of Classification Search
CPC .... H02J 50/402; B60L 53/12; B60L 2210/10; B60L 2200/10; B60L 2210/30; B60L 53/22; Y02T 90/14; Y02T 10/7072; Y02T 10/70; Y02T 10/72
See application file for complete search history.

(56) References Cited

U.S. PATENT DOCUMENTS

| | | | |
|---|---|---|---|
| 2015/0229133 A1 | 8/2015 | Reynolds et al. | |
| 2016/0079753 A1* | 3/2016 | Corum ................. | H04B 5/0037 307/149 |
| 2016/0241087 A1* | 8/2016 | Bae ........................ | H02J 50/60 |

OTHER PUBLICATIONS

Pedross-Engel, et al, Self-Jamming Mitigation via Coding for Millimeter-Wave Imaging With Direct Conversion Receivers, IEEE Microwave and Wireless Components Letters, vol. 27, No. 4, p. 410-412, Apr. 2017.

\* cited by examiner

DYNAMIC RECTIFIER CIRCUITS WITH MULTIPLE-ORDER TIMESCALE FEEDBACK CONTROLS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc., applications of such applications are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc., applications of the Priority Application(s)). In addition, the present application is related to the "Related Applications," if any, listed below.

PRIORITY APPLICATIONS

None

RELATED APPLICATIONS

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

This disclosure relates to wireless power transfer. Specifically, this disclosure relates to wireless power receivers with dynamic feedback controls over multiple-order timescales.

DETAILED DESCRIPTION

Figure 1A:
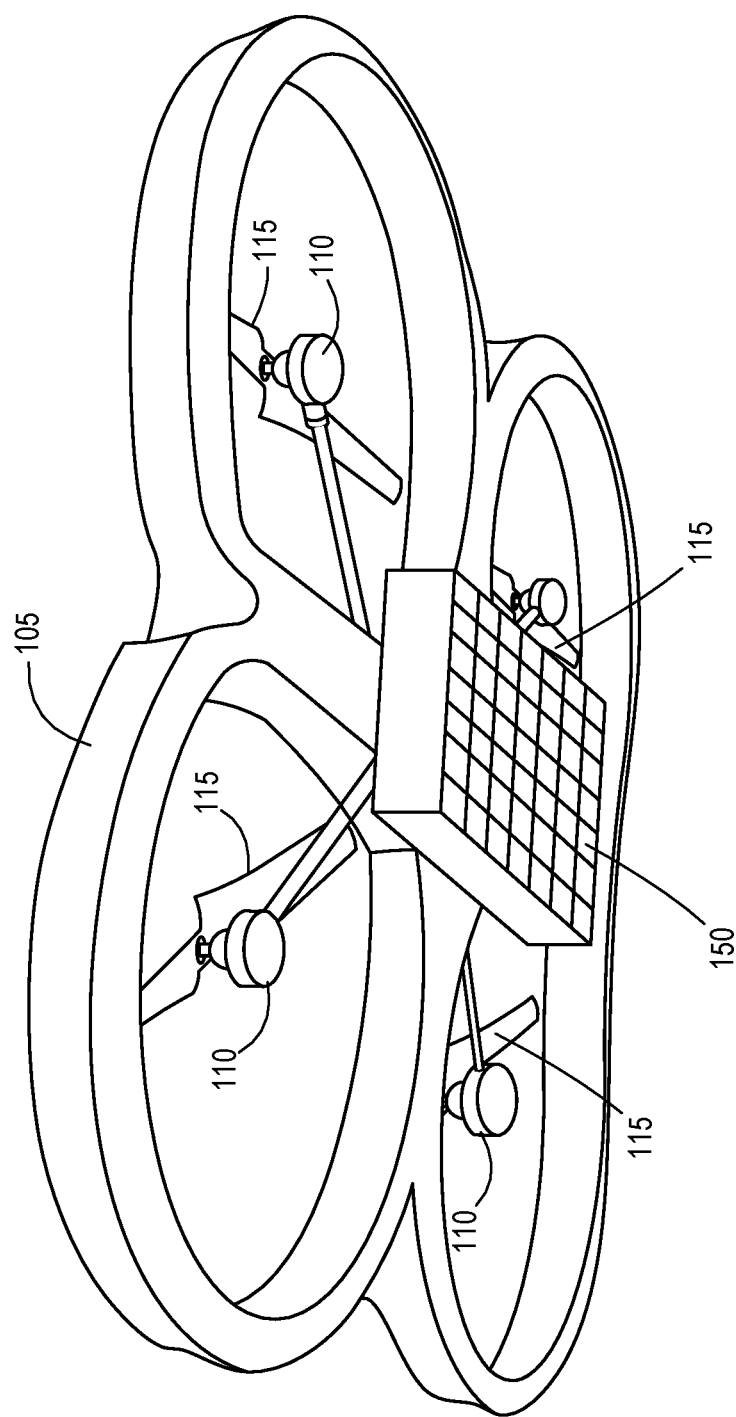
FIG. 1A illustrates an example of an unmanned aerial vehicle (UAV) with a tunable multi-timescale wireless rectification system for receiving wireless power, according to one embodiment.

According to various embodiments of the systems and methods described herein, a power transmitter provides wireless power to a receiver. The systems and methods described herein may be implemented with any of a wide variety of transmitter and receiver sizes, types, configurations, etc. to satisfy the demands of various applications. Many of the example embodiments described herein are provided in the context of a wireless power transmitter used to provide wireless power to a receiver of an unmanned aerial vehicle (UAV) sometimes referred to as unmanned aerial systems (UASs). A beamform calculator may determine a target beamform suitable for providing wireless power based on a relative location of the target device and the power transmitter. An updated or revised target beamform may be calculated based on the movement of one or both of the target device and the power transmitter. That is, an optimized beamform may be calculated for each location of the target device relative to the power transmitter.

Updated target beamforms may be calculated based on the relative movement of the power transmitter and receiver of the target device. The transmitted beamform may be adjusted based on, for example, a determined location of the receiver of the target device and/or channel calculations to maintain one or more characteristics of the wireless power transfer within predetermined thresholds and/or for optimization of such characteristics. An example of location-based target beamforming is described in U.S. patent application Ser. No. 15/832,612 filed on Dec. 5, 2017, titled Non-Gaussian Beamforming for Wireless Power Transfer Optimization.

This disclosure particularly relates to wireless power receiver components and feedback control circuits to convert received EMR into direct current (DC) power for storage and/or consumption by an electronic device. Multiple feedback controls associated with different portions of the wireless power receiver may operate on various timescales to optimize the power transfer and/or maintain power transfer within predefined limits or ranges. Wireless power receivers may be integrated within, attached to, or otherwise associated with any of a wide variety of electronic devices including, without limitation, mobile phones, tablet computing devices, wearable tech devices, watches, laptop computers, UAVs, robots, autonomous sensors, mobile battery storage devices, automobiles, busses, passenger and cargo trains, computer peripheral devices, autonomous vehicles, sensor arrays, and other mobile or stationary devices that consume electricity.

In one embodiment, wireless power receivers, utilizing the systems and methods described herein, provide power to a wireless base station configured to provide wireless communication access to other devices (e.g., Wi-Fi or LTE signals to mobile devices). The wireless base station may be deployed remotely and powered via wireless power received from a wireless power transmitter.

Many of the examples described herein, including the illustrated embodiments, relate to wireless power transfer via a stationary or mobile power transmitter to a mobile UAV. Nevertheless, many of the principles described in the context of powering UAVs are equally applicable to wireless power received to power other types of devices, whether mobile or stationary. Specifically, any of a wide variety of devices may be configured with one or more receiving antennas to receive electromagnetic energy also known as electromagnetic radiation (EMR) from a power transmitter. The antennas convert the EMR (e.g., microwave RF signals) into an AC electrical current. A converter may convert the AC electrical current into a DC electrical current. This general process, frequently described herein in the context of a UAV, can be applied or easily adapted to a wide variety of other devices. In some embodiments, a single-element receiver configured to receive EMR from a power transmitter may be used instead of a multi-element receiver. The antennas may operate to receive wireless power at a fixed frequency and/or may be adapted or tuned to receive wireless power at different frequencies. Examples of possible frequencies include 5.8 GHz, 2.4 GHz, 24 GHz, etc.

As an example, a power transmitter may provide wireless power in the form of an electromagnetic signal to one or more receivers on one or more UAVs. A wireless power receiver, or simply "receiver" or "EMR receiver," may have a single antenna (or antenna element) or have multiple antennas (or antenna elements). The receiver may additionally include one or more transponders, reflectors, receivers, transceivers, and/or transmitters that are dedicated to or additionally configured to send and/or receive data to and/or from the power transmitter.

In various embodiments, the wireless power receiver comprises a tunable multi-timescale wireless rectification system with one or more antennas, rectifying devices, impedance-matching components, DC-to-DC converters, and/or energy storage devices. The wireless power receiver includes one or more feedback controls to dynamically adjust one or more characteristics of one or more antennas, impedance matching components, rectifying devices, DC-to-DC converters, energy storage devices, and/or power-consuming devices.

In one embodiment, an antenna feedback control operates on a first timescale to modify AC power delivered from the antennas to the rectifying devices. For example, the antennas or a controller associated with the antennas may be responsive to the first feedback control to modify a characteristic of the antennas. A rectification feedback control operates on a second timescale to modify DC power delivered from the rectifying devices to the load by modifying a characteristic of the rectifying devices. An impedance feedback control operates on a third timescale to further modify AC power delivered from the antennas to the rectifying devices by modifying impedances of the impedance-matching components. A fourth feedback control operates on a fourth timescale to modify a DC power characteristic of power delivered from the rectifying devices to the load (e.g., via the DC-to-DC converter). In some embodiments, each of the feedback controls may operate on widely disparate timescales. For example, one of the feedback controls may operate on a microsecond timescale, another of the feedback controls may operate on a millisecond timescale, and another of the feedback controls may operate on a second or even tens-of-seconds timescale.

The rectification system may include any combination of the feedback controls described herein. A rectification system may be configured to include just one of the feedback controls or a combination of two or three of the feedback controls. The rectification system may provide power to any of a wide variety of loads, including energy storage loads (e.g., capacitors, batteries, etc.) and power consuming loads (e.g., propulsion/lift components, sensors, processors, etc.). In many embodiments, a wireless rectification system may include multiple antennas, rectifying devices, impedance-matching components, and DC-to-DC converters. The numbers of each of these components may be 1:1 or many to one (e.g., X:Y, where X and Y are integer values).

In one embodiment, a tunable multi-timescale wireless rectification system may include a plurality of antennas, a plurality of rectifying devices, a plurality of impedance-matching components, and a plurality of DC-to-DC converters. The DC-to-DC converters may control the power delivered to load(s), such as energy storage and/or consumption devices of the UAV. The tunable multi-timescale wireless rectification system may include an antenna feedback control to modify the AC power delivered from the antennas to the rectifying devices. The antenna feedback control may modify a characteristic of one or more of the antennas. An impedance feedback control may modify a characteristic of one or more of the impedance-matching components. The antenna feedback control and/or the impedance feedback control may operate on a first timescale that is relatively fast.

For example, the antenna and/or impedance feedback control may operate to modify a characteristic of the antenna to decrease or increase the gain or frequency response in response to increased or decreased power being delivered from a wireless power transmitter. Any of the various feedback controls may be based, at least in part, on data received from the wireless power transmitter or an associated remote system. In various embodiments, the controller communicates with the remote transmitter via a radio frequency (RF) link, Bluetooth, Wi-Fi (based on reflected portions of the incoming power signal), an optical link (e.g., infrared, visible, or ultraviolet), or the like.

A controller associated with a multi-timescale wireless rectification system may adjust a setting of one or more of remote transmitters, transmitting antennas, receiving antennas, rectifying devices, impedance-matching components, DC-to-DC converters, and/or other elements. Additionally, or alternatively, the first feedback control may operate to modify a characteristic of impedance-matching components to increase or decrease the voltage or current delivered to the rectifying devices.

For example, the antenna elements may be embodied as shape-shifting antennas that change shape in response to an applied current or applied heat. For instance, the antennas, or components thereof, may comprise electromechanical shape-shifting antennas. The first feedback control may control the shape of the shape-shifting antennas to modify the conversion of EMR into an AC current. In one embodiment, the antenna feedback control may modify a dielectric constant of one or more of the antennas or antenna elements.

One or more antenna feedback controls may control the shape of one or more antennas to modify one of a resonance of an antenna, a Q-factor of an antenna, a dielectric constant of an antenna, an impedance of an antenna, a gain of an antenna, a beam shape of an antenna or antenna array, and/or a physical attribute of one or more antennas or antenna elements.

In addition to or instead of an antenna feedback control, an impedance feedback control may modify real or imaginary components of the impedance-matching components to modify the AC power delivered from the antennas to the rectifying devices. The impedance-matching components may be responsive to the impedance feedback control to limit the AC power throughput below a maximum value. For instance, one or more (or all) of the impedance matching components may be responsive to the impedance feedback control to dynamically varying impedance values. The impedance feedback control may modify a phase shift of one or more of the impedance-matching components.

The impedance-matching components may comprise tunable circuits that are responsive to the impedance feedback control. For example, the impedance feedback control may comprise an analog feedback loop that provides a signal to the tunable circuits of one or more of the impedance-matching components based on the output of the rectifying devices. The impedance feedback control may be operative to implement a target feedback response. For example, the impedance feedback control may be configure to (i) limit the AC power throughput below a maximum value, (ii) optimize (e.g., maximize) accepted AC power, (iii) optimize (e.g., minimize) reflected AC power, and/or (iv) optimize (e.g., minimize or modify) AC components generated by circuit components and/or the load (e.g., harmonics and/or other frequency components). Impedance and/or antenna feedback controls may modify characteristics of one or more antennas and/or impedance matching components to reflect (i.e., reject) power from or back to the one or more antennas.

Any of the various feedback controls described herein may be used to optimize various portions or components of the energy conversion process. For example, feedback controls may optimize generated harmonics by reducing or suppressing them. In contrast, feedback controls may optimize received EMR by maximizing a total output power, maintaining a power level below a threshold, maximizing an efficiency of power conversion, reducing reflected EMR, controlling temperature hotspots, etc. Accordingly, it can be understood that "optimizing" a particular element, device, characteristic, etc. may be "optimized" in a variety of ways depending on the specific targets and goals of the system. Some optimization targets can be generally assumed.

For example, optimizing noise in a system may generally be assumed to be a minimization or suppression process. In contrast, optimization of a DC-to-DC power conversion may, in some embodiments, include maximizing an efficiency of the transfer while, in other embodiments, include reducing reflections at the expense of efficiency. Various optimization strategies are described herein, and others can be understood in context. Examples of optimization strategies include maximizing efficiency, maintaining a value below a threshold, maximizing a total value, minimizing a value, controlling a value, controlling a distribution, minimizing reflections, minimizing harmonics, controlling harmonics, adjusting a power factor, suppressing generated AC components, and/or combinations or weighted functions thereof.

In various embodiments, the impedance-matching components comprise adaptive components. For example, the impedance-matching components may be tunable based on a feedback control signal, such as a digital or analog reflection feedback control signal. Examples of adaptive components responsive to feedback control signals include, for example, diodes, PIN diodes, transistors, varactors, limiter devices, mechanical switches, solid state relays, electronic switches, shape-changing devices, materials or devices with tunable dielectric constant, and/or materials and devices with tunable nonlinear power characteristics. In some embodiments, one or more of the antennas (or antenna elements) and/or impedance-matching components may comprise tunable metamaterial devices. In such embodiments, feedback control signals may tune the metamaterial devices.

The impedance feedback control may provide a biasing signal to one or more of the impedance-matching components. In some embodiments, the impedance feedback control may be an inherent feedback characteristic of the impedance-matching component. The impedance feedback control may operate to maximize or otherwise optimize power conversion efficiency, minimize or otherwise control temperature hotspots, prevent a power magnitude from exceeding a target value, stabilize output power, maintain a power output within a threshold range, minimize reflected power, minimize generated harmonics, or the like. In some embodiments, the number of antenna elements, the number of impedance-matching elements, and the number of rectifying devices may be the same. In such an embodiment, antenna and/or impedance feedback controls may comprise an equal number of feedback loops. That is, the system may include one (or more) feedback loop(s) for each free-space EMR to DC power component set (e.g., antenna, impedance-matching component, and rectifying device). The feedback loop may modify the antennas or impedance-matching components based on the output of each associated rectifying device.

In some embodiments, multiple antennas and/or impedance-matching components may be connected to a single rectifying device. The feedback control may be based on the output of the single rectifying device. In some embodiments, the feedback control may modify characteristics of the antenna(s) and/or impedance-matching component(s) based on the output of the rectifying device(s), the output of the DC-to-DC converter(s), and/or in response to power consumption or status of a storage device.

In addition to or instead of an antenna feedback control and/or an impedance feedback control, a multi-timescale wireless rectification system may include a rectification feedback control to modify DC power delivered from the rectifying devices to the load by modifying a characteristic of the rectifying devices. The rectification feedback control may operate on a different timescale than the antenna feedback control and/or impedance feedback control. In some embodiments, a rectifying device may include one or more diodes, a switchable power divider network, a capacitor, a battery, an inductor, a transistor, a resistor, Zener diodes, thyristors, crowbar circuits, electronic relays, solid-state relays, electromechanical relays, or the like.

For example, the antenna and/or impedance feedback control(s) may operate very quickly (e.g., within nanoseconds, microseconds, or milliseconds) to modify the AC power delivered to the rectifying device(s). The rectification feedback control may operate on a slower timescale (e.g., tens or hundreds of milliseconds, or even seconds). The rectification feedback control may operate to maximize or otherwise optimize power conversion efficiency, minimize temperature hotspots, maintain temperatures below threshold values, prevent a power magnitude from exceeding a target value, stabilize output power, maintain a power output within a threshold range, minimize reflected power, minimize generated harmonics, or the like.

A multi-timescale wireless rectification system may include a DC feedback control to modify DC power delivered from the rectifying devices to the load. The DC feedback control may provide a feedback signal based on a load impedance, status of an energy storage device, load demand, expected load demand, or the like. The DC feedback control may modify a characteristic of a rectifier to modify the DC power delivered to the load. The DC feedback control may, alternatively or additionally, modify a characteristic of a DC-to-DC converter operating between the rectifier and the load. Similar to other feedback controls, the DC feedback control may operate to maximize or otherwise optimize power conversion efficiency, minimize or otherwise control temperature hotspots, maintain temperatures below threshold values, prevent a power magnitude from exceeding a target value, stabilize output power, maintain a power output within a threshold range, minimize reflected power, minimize generated harmonics, or the like.

The DC feedback control may operate to modify (increase or decrease) a DC voltage delivered to a load. The DC feedback control may operate to modify a DC current delivered to a load. The DC feedback control may operate to modify a total DC power delivered to a load. For instance, a multi-timescale wireless rectification system may comprise a DC-to-DC pulse width modulation controller. The DC feedback control may drive the pulse width modulation controller.

In other embodiments, the DC feedback control may modify an input or output impedance of the DC-to-DC converter. The DC feedback control may operate to maintain a constant input and/or output impedance of the DC-to-DC converter. The DC feedback control may adjust rectifiers and/or DC-to-DC converters to maintain a constant or smoother DC power output. The DC-to-DC converter may comprise a maximum power point tracking (MPPT) controller. The MPPT may operate to maintain a DC voltage and/or current levels at a maximum total output power, maximize power efficiency, minimize heating, maintain a voltage above a threshold minimum, maintain a current level within a bounded threshold, or the like. The DC feedback control may operate to modify a target or goal of the MPPT controller. The DC feedback control may operate to modify the input and/or output impedance of the MPPT controller.

In various embodiments, the DC feedback control may comprise one or more analog or digital feedback loops. The DC feedback control may, for example, comprise a digital controller (e.g., a field-programmable gate array (FPGA), a microcontroller or microprocessor). The digital controller may receive one or more inputs and, in response, drive one or more rectifiers and/or DC-to-DC converters. For example, the digital controller may receive values from sensors (e.g., voltage and/or current sensors) and/or external data sources.

In another example, other components and/or processors of the UAV may indicate future power demand to the digital controller. The digital controller may provide a DC feedback control to drive the DC-to-DC converter in response to the indicated future power demand. In another embodiment, the wireless power transmitter may communicate a future increase or decrease in power availability. The digital controller may transmit a DC feedback control to drive the DC-to-DC converter(s) and/or rectifier(s) in response to the anticipated change in power availability.

In some embodiments, the DC feedback control may operate to bias a gate voltage of one or more transistors. The DC feedback control may operate to bias a voltage of one or more inputs of one or more transistors to optimize power output. The optimization may, for example, include maximizing the power output. In still other embodiments, the antennas and rectifying devices may be embodied as rectennas, or even as tunable rectennas. In such an embodiment, the DC feedback control may operate to tune the rectennas to modify the DC output of the rectennas.

In some embodiments, the system may include more than one DC feedback control. One DC feedback control may operate to modify or tune a rectenna. One or more additional DC feedback controls may operate to modify one or more of rectifiers, DC-to-DC buck or boost converters, MPPTs, or one of a variety of DC-to-DC converters. The various DC feedback controls may operate on different timescales and in response to different inputs.

The DC output may be adjusted based on the type of load. The load, for example, may comprise batteries of various types that require various charge profiles at various voltages. For example, the DC output may be modified based on the state of charge (SOC) percentage and a known battery type to safely and fully charge a battery of a particular composition. The DC feedback control may modify DC outputs based on detected or measured values associated with alternative storage devices, such as capacitive inductive, or mechanical energy storage devices.

In still other embodiments, the DC output may be modified to support one or more alternative or additional loads, such as propulsion devices, lights, sensors, ultrasound transmitters, ultrasound receivers, electromagnetic transmitters, LiDAR sensors, data processing devices, boost converters, buck converters, buck-boost converters, single-ended primary-inductor converters (SEPICs), and/or flyback converters.

In some embodiments, a multi-timescale wireless rectification system may include a load controller to dynamically add or shed load. In some embodiments, the load controller may operate based on a feedback control signal to adjust the amount or type of load based on available power, expected future power availability, a received signal indicating future power availability, energy storage capacity, motor power demand, and/or another system status change. The load controller may be embodied as a programmable digital logic element, programmable digital logic, a field-programmable gate array (FPGA), an analog feedback loop, or other dynamic feedback system.

The load controller may operate on a feedback control operating a different timescale than other timescales. The timescale for the feedback control for the load controller may operate in response to voltage drops and/or detected current shortages. In other embodiments, the timescale for the feedback control for the load controller may operate on an anticipatory basis. That is, the load controller may add or shed load based on expected power availability.

The load controller may operate in combination with DC power combiners and/or DC-to-DC converters. Any of the various feedback controls may be based, at least in part, on power measurements, temperature measurements, current measurements, voltage measurements, and/or other sensor readings.

Components of a receiver may be adapted based on the frequency used for EMR power transmission. For example, components for radio frequencies (RF) may be different than those used for optical or infrared frequencies. Examples of possible frequency bands include those in the industrial, scientific and medical (ISM) radio band, 5.8 GHz, 2.4 GHz, 24 GHz, optical frequencies, and infrared frequencies. Specific frequency bands may be more suitable for different power levels, transmission distances, line-of-sight applications, through-object applications, etc. Moreover, specific frequency bands may be utilized to comply with government regulations, to limit interference with other equipment, and/or to otherwise conform to the specifications of a particular application or use-case.

Many existing computing devices and infrastructures may be used in combination with the presently described systems and methods. Some of the infrastructure that can be used with embodiments disclosed herein is already available, such as general-purpose computers, computer programming tools and techniques, digital storage media, and communication links. Many of the systems, subsystems, modules, components, and the like that are described herein may be implemented as hardware, firmware, and/or software. Various systems, subsystems, modules, and components are described in terms of the function(s) they perform because such a wide variety of possible implementations exist. For example, it is appreciated that many existing programming languages, hardware devices, frequency bands, circuits, software platforms, networking infrastructures, and/or data stores may be utilized alone or in combination to implement a specific function.

It is also appreciated that two or more of the systems, subsystems, components, modules, etc. that are described herein may be combined as a single system, subsystem, module, or component. Moreover, many of the systems, subsystems, components, and modules may be duplicated or further divided into discrete systems, subsystems, components, or modules to perform subtasks of those described herein. Any of the embodiments described herein may be combined with any combination of other embodiments described herein. Many of the embodiments of the systems and methods described herein that appear to be mutually exclusive may be used in combination as weighted functions of one another and/or in primary-backup configurations in which one embodiment is used primarily, and the other embodiment is available as a backup.

As used herein, a computing device, system, subsystem, module, or controller may include a processor, such as a microprocessor, a microcontroller, logic circuitry, or the like. A processor may include one or more special-purpose processing devices, such as application-specific integrated circuits (ASICs), programmable array logic (PAL), programmable logic array (PLA), programmable logic device (PLD), field-programmable gate array (FPGA), or other customizable and/or programmable device. The computing device may also include a machine-readable storage device, such as non-volatile memory, static RAM, dynamic RAM, ROM, CD-ROM, disk, tape, magnetic, optical, flash memory, or another machine-readable storage medium. Various aspects of certain embodiments may be implemented using hardware, software, firmware, or a combination thereof.

The components of some of the disclosed embodiments are described and illustrated in the figures herein. Many portions thereof could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure. The Applicant(s) explicitly reserve the right to add any described embodiment, feature, or combination thereof to any one of the figures and/or as a new figure, along with supporting written descriptions, without adding any new matter.

The embodiments of the systems and methods provided within this disclosure are not intended to limit the scope of the disclosure but are merely representative of possible embodiments. In addition, the steps of a method do not necessarily need to be executed in any specific order, or even sequentially, nor do the steps need to be executed only once. As described above, descriptions and variations described in terms of transmitters are equally applicable to receivers, and vice versa.

FIG. 1A illustrates an example of an unmanned aerial vehicle (UAV) 105 with a tunable multi-timescale wireless rectification system as part of an EMR receiver 150 for receiving wireless power, according to one embodiment. The illustrated UAV 105 is a quadcopter with four discrete motors 110 and associated rotors 115. It is appreciated that any of a wide variety of UAVs may utilize the systems and methods described herein, including fixed-wing UAVs, vertical take-off and landing (VTOL) UAVs, helicopters, hexacopter, octocopters, and n-copter devices with any number of discrete rotors, propellers, stabilizers, or other propulsion or lift devices.

In the illustrated embodiment, the EMR receiver 150 is rectangular, and the multi-element nature of the EMR receiver 150 is represented by the grid of square elements. It is appreciated that the EMR receiver 150 may be any shape, size, or thickness, and may have elements that face in directions other than straight down. In some embodiments, the EMR receiver pivots and/or rotates to maximize or otherwise optimize a power characteristic, as described herein.

Figure 1B:
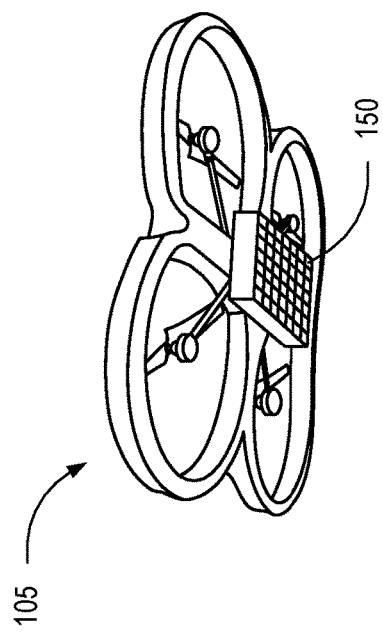
FIG. 1B illustrates a wireless power transmitter transmitting wireless power to a mobile UAV, according to one embodiment.
Figure 1B:
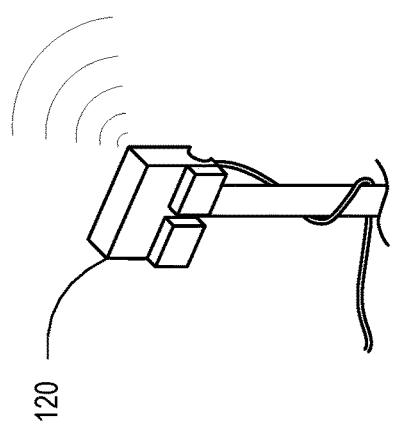

FIG. 1B illustrates a wireless power transmitter 120 transmitting wireless power to a mobile UAV 105 fitted or retrofitted with an EMR receiver 150 for receiving EMR and converting the received EMR into an electric current, according to various embodiments. The wireless power transmitter 120 may be part of a network of wireless power transmitters. Each of the wireless power transmitters in the network of wireless power transmitters may generate a steerable wireless beam to the UAV 105 as it moves. The EMR receiver 150 may be embodied as multi-timescale wireless rectification system, according to any combination of the various embodiments described herein.

Figure 1D:
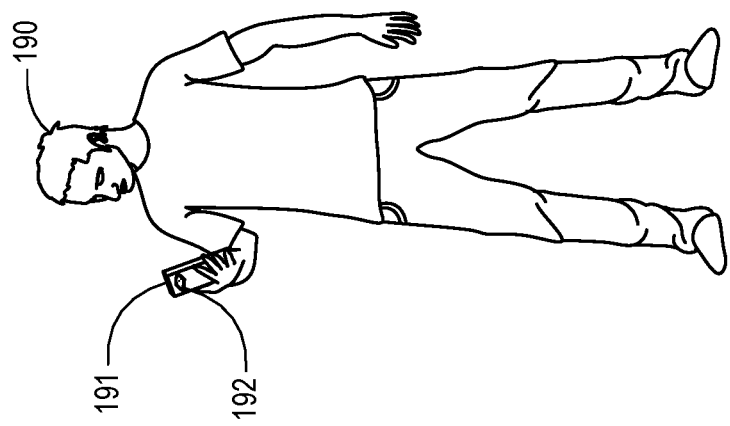
FIG. 1D illustrates an example of a personal mobile device with a tunable multi-timescale wireless rectification system for receiving wireless power, according to one embodiment.
Figure 1C:
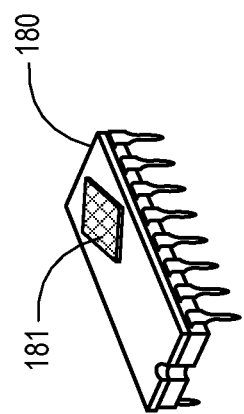
FIG. 1C illustrates an example of an electronic circuit with a tunable multi-timescale wireless rectification system for receiving wireless power, according to one embodiment.

FIG. 1C illustrates a packaged computer chip 180 with a small EMR receiver 181 affixed thereto. The EMR receiver 181 may supply a DC electric current to the computer chip 180 by converting EMR received from an EMR transmitter according to any of the various embodiments described herein. The EMR receiver 181 may be embodied as a multi-timescale wireless rectification system, according to any combination of the various embodiments described herein.

FIG. 1D illustrates a user 190 of a mobile phone 191. The user 190 may retrofit a case of the mobile phone 191 with an EMR receiver 192 to receive wireless power. Alternatively, the EMR receiver 192 may be integrated within the mobile phone 191 by, for example, the manufacturer of the mobile phone 191 or manufacturer of the power supply or power storage device of the mobile phone 191.

Any of a wide variety of devices may be fitted, configured with, retrofitted with, or manufactured with integral EMR receivers to receive EMR from mobile and/or stationary power transmitters. Examples of devices include, but are not limited to, mobile phones, tablet computing devices, wearable tech devices, watches, laptop computers, unmanned aerial vehicles (UAVs), mobile battery storage devices, robots, automobiles, busses, laptops, computer peripheral devices, and other mobile or stationary devices that consume electricity. The EMR receiver 192 may be embodied as any combination of the various embodiments of tunable multi-timescale wireless rectification systems for receiving wireless power described herein.

Figure 2:
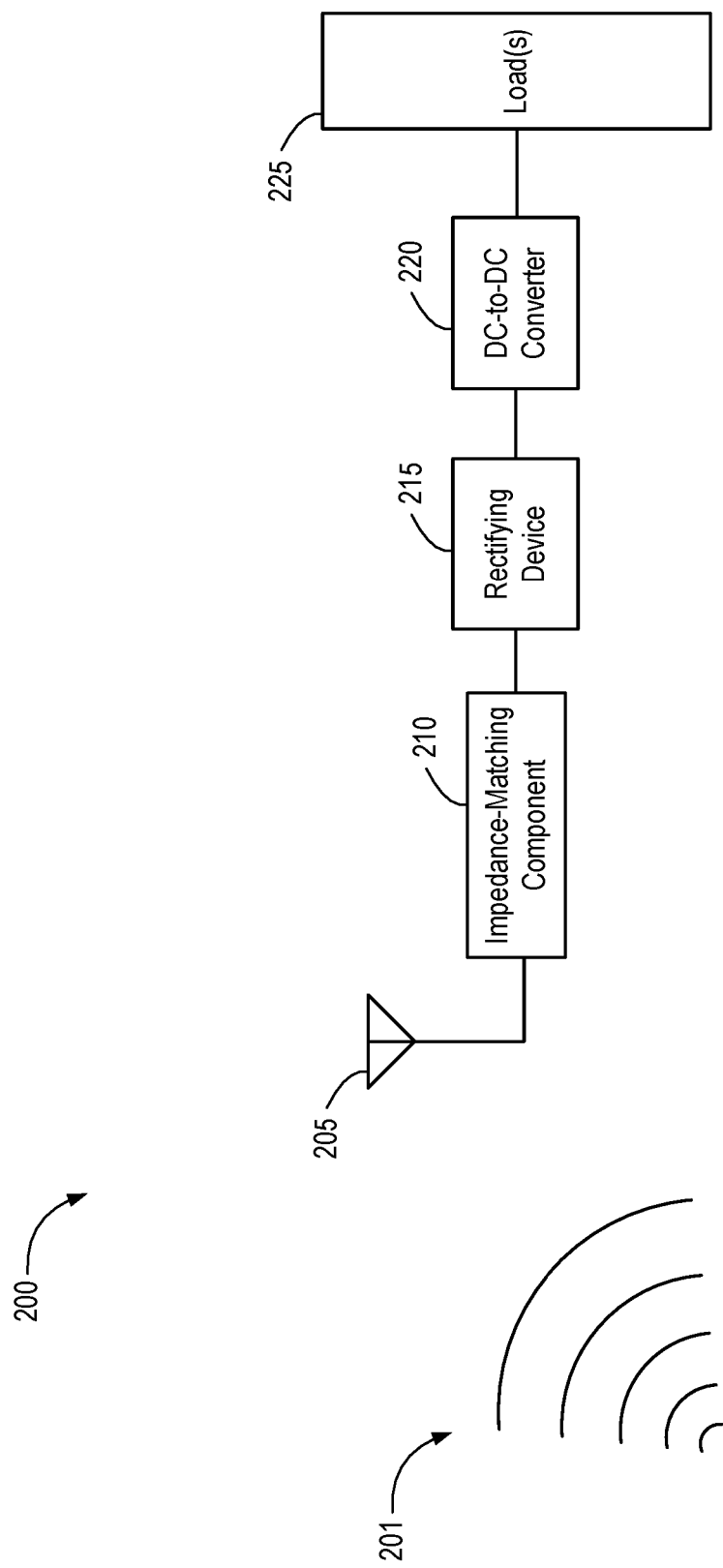
FIG. 2 illustrates a simplified block diagram of a wireless rectification system for converting electromagnetic radiation (EMR) into DC power for consumption by a load, according to one embodiment.

FIG. 2 illustrates a simplified block diagram of a wireless rectification system 200 for converting EMR 201 into DC power for consumption by one or more loads 225. Various power consuming devices and/or power storage devices may be described as a single load or as loads 225. An antenna 205 may receive the EMR 201. An impedance-matching component 210 may provide input and/or output impedance matching for controlling the AC current delivered from the antenna 205 to the rectifying device 215. The rectifying device 215 may convert the AC power to DC power utilizing any of a wide variety of circuits, controllers, discrete electrical components, and the like. The rectifying device 215 may be embodied as any of a wide variety of rectifying devices known in the art.

A DC-to-DC converter 220 may modify DC power produced by the rectifying device 215 for delivery of DC power to the load 225. In FIG. 2, and in various other illustrated embodiments of this disclosure, the antenna 205, the impedance-matching component 210, the rectifying device 215, and the DC-to-DC converter 220 are shown as separate components in electrical communication with one another. In other embodiments, one or more of the antenna 205, the impedance-matching component 210, the rectifying device 215, and/or the DC-to-DC converter 220 may be combined as a single component, packaged together, and/or configured to provide overlapping functions. In still other embodiments, one or more of the antenna 205, the impedance-matching component 210, the rectifying device 215, and/or the DC-to-DC converter 220 may be divided into sub-components.

The tunable multi-timescale wireless rectification system, according to any combination of the various embodiments described herein, may be utilized in conjunction with the illustrated wireless rectification system 200. For example, a tunable multi-timescale wireless rectification system may be used to improve, protect, or otherwise control the conversion of EMR 201 to DC power for the load 225 by the wireless rectification system 200.

Figure 3:
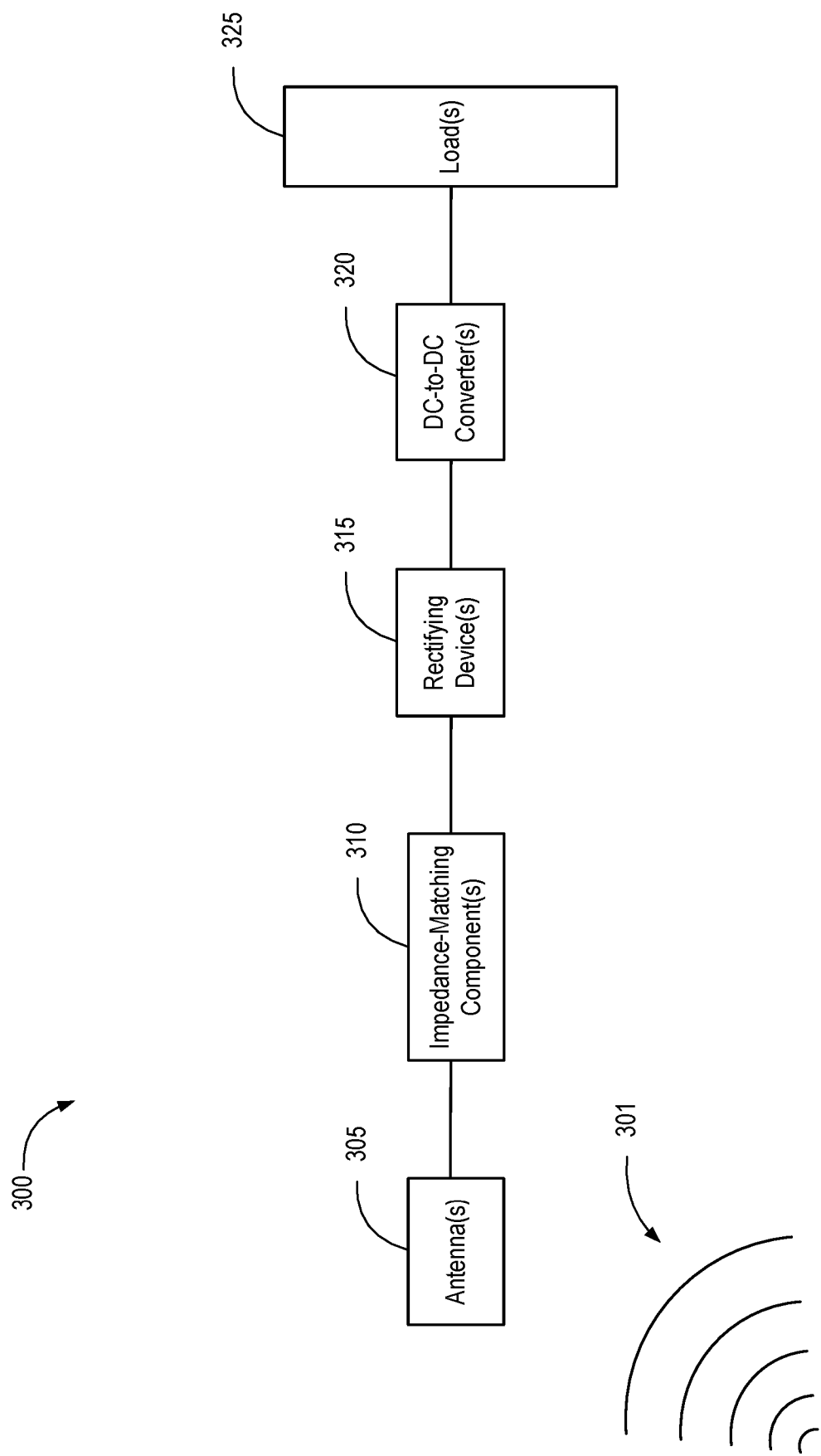
FIG. 3 illustrates another simplified block diagram of a wireless rectification system for converting EMR into DC power for consumption by a load, according to one embodiment.

FIG. 3 illustrates another simplified block diagram of a wireless rectification system 300 for converting EMR 301 into DC power for consumption by a load 325, according to one embodiment. In the illustrated embodiments, an antenna(s) block 305 represents any of a wide variety of antenna types for receiving beamformed wireless EMR 301 from a wireless power transmitter. An impedance-matching component(s) block 310 represents any number or type of impedance-matching components for electrically connecting any number of antennas 305 to one or more rectifying devices 315. Any number of DC-to-DC converters 320 may connect the one or more rectifying devices 315 to one or more loads 325.

The wireless rectification system 300 may include multiple antennas 305, rectifying devices 315, impedance-matching components 310, and DC-to-DC converters 320. The numbers of each of these components may be 1:1:1:1 or many to one (e.g., W:X:Y:Z, where W, X, Y, and Z are integer values). The wireless rectification system 300 may provide power to any of a wide variety of loads 325, including energy storage loads (e.g., capacitors, batteries, etc.) and power consuming loads (e.g., propulsion/lift components, sensors, processors, etc.).

Figure 4:
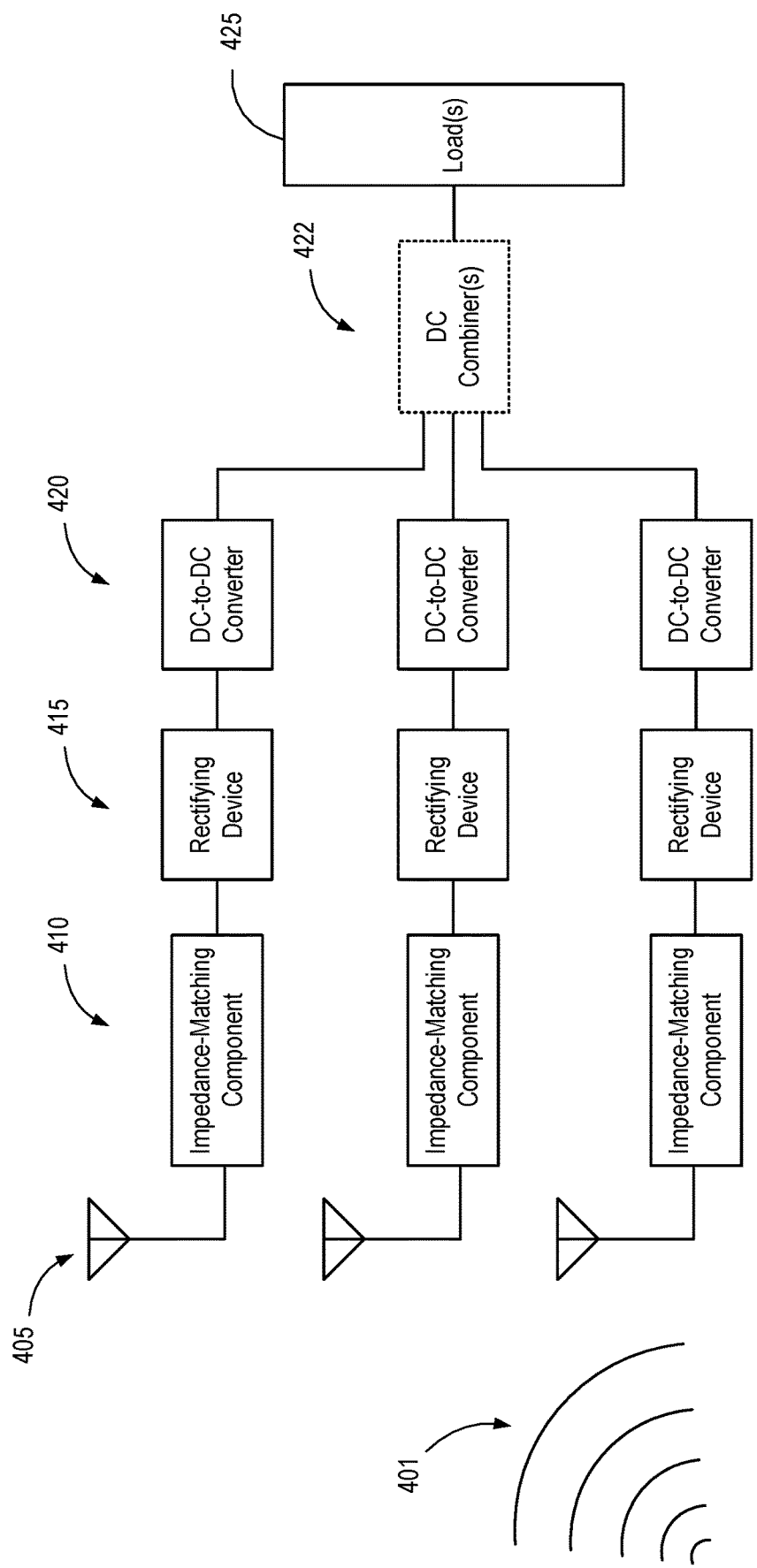
FIG. 4 illustrates another simplified block diagram of a wireless rectification system for converting EMR into DC power for consumption by a load, according to one embodiment.

FIG. 4 illustrates another simplified block diagram of a wireless rectification system for converting EMR 401 into DC power for consumption by one or more loads 425, according to one embodiment. The illustrated embodiment shows multiple antennas 405, impedance-matching components 410, rectifying devices 415, and DC-to-DC converters 420. Optionally, one or more DC combiners 422 may connect the output of the DC-to-DC converters 420 to the load 425. FIG. 4 is an example of a wireless rectification system 400 with 1:1 component ratios of various components. Any of the various tunable multi-timescale wireless rectification systems, or combinations thereof, may be used to enhance the functionality of the illustrated wireless rectification system 400.

Figure 5:
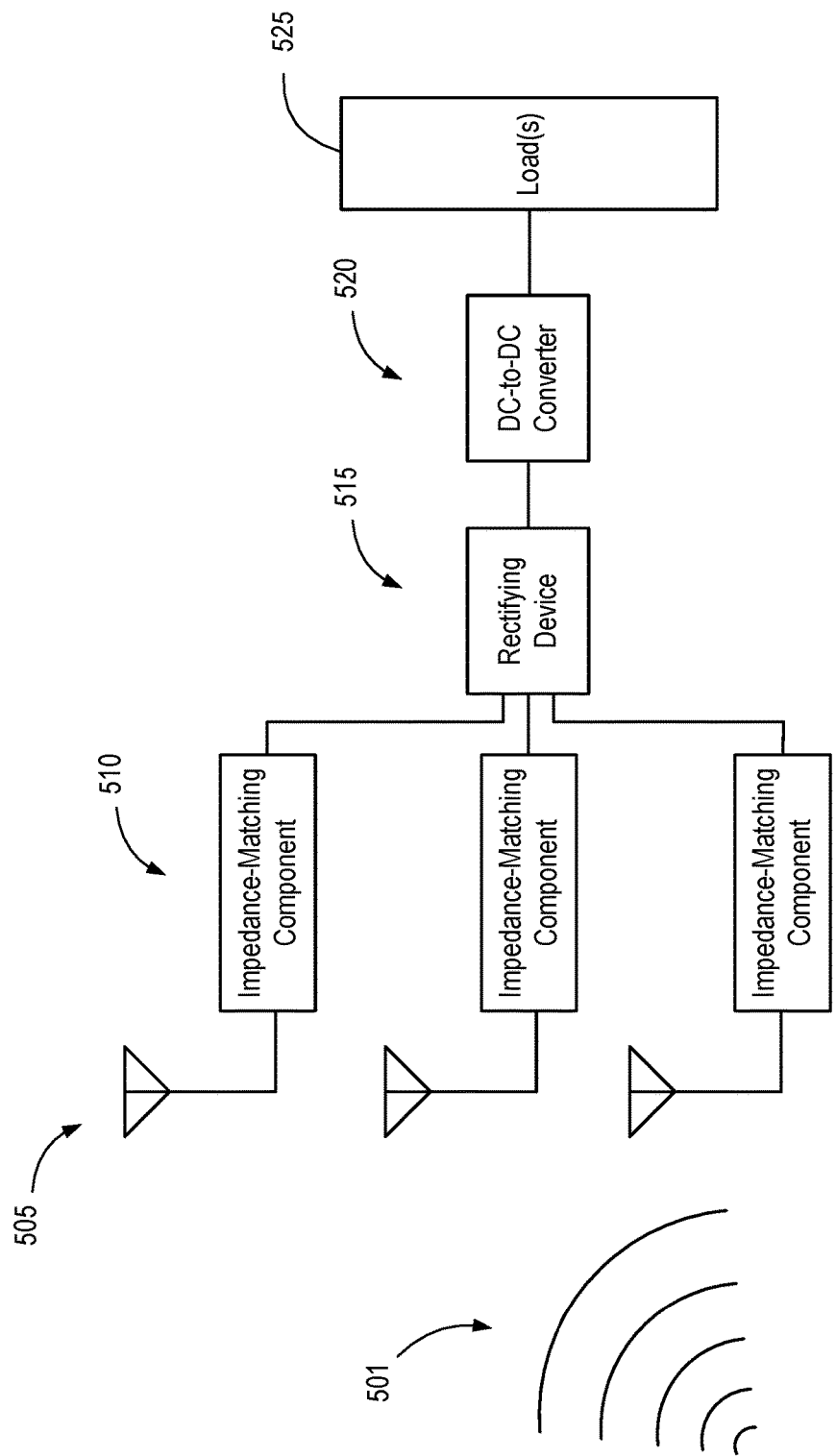
FIG. 5 illustrates another simplified block diagram of a wireless rectification system for converting EMR into DC power for consumption by a load, according to one embodiment.

FIG. 5 illustrates another simplified block diagram of a wireless rectification system 500 for converting EMR 501 into DC power for consumption by one or more loads 525, according to one embodiment. In the illustrated embodiment, a single rectifying device 515 receives impedance-matched AC power from the antennas 505 via the impedance-matching components 510. A DC-to-DC converter 520 provides modified power between the rectifying device 515 and the load(s) 525. Any of the various tunable multi-timescale wireless rectification systems, or combinations thereof, may be used to enhance the functionality of the wireless rectification system 500 in FIG. 5.

Figure 6:
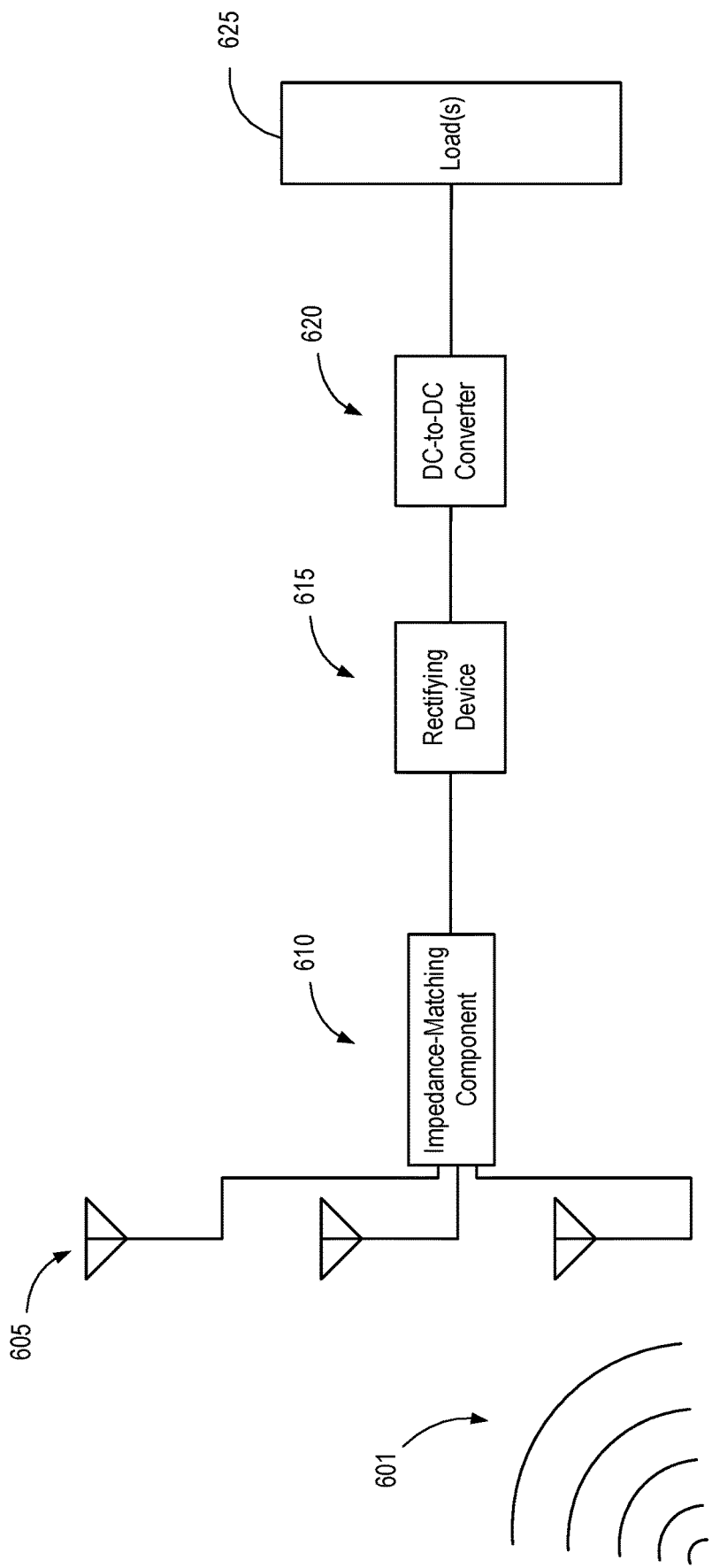
FIG. 6 illustrates another simplified block diagram of a wireless rectification system for converting EMR into DC power for consumption by a load, according to one embodiment.

FIG. 6 illustrates another simplified block diagram of a wireless rectification system for converting EMR 601 into DC power for consumption by one or more loads 625, according to another embodiment. In the illustrated embodiment, an array of antennas 605 (or antenna elements of a single antenna) receive EMR 601. An impedance-matching component 610 delivers modified AC power from the antennas 605 to a rectifying device 615. DC-to-DC converter 620, according to any of the various DC-to-DC converter embodiments described herein, may provide the rectified power to the load(s) 625. Any of the various tunable multi-timescale wireless rectification systems, or combinations thereof, may be used to enhance the functionality of the wireless rectification system in FIG. 6.

Figure 7:
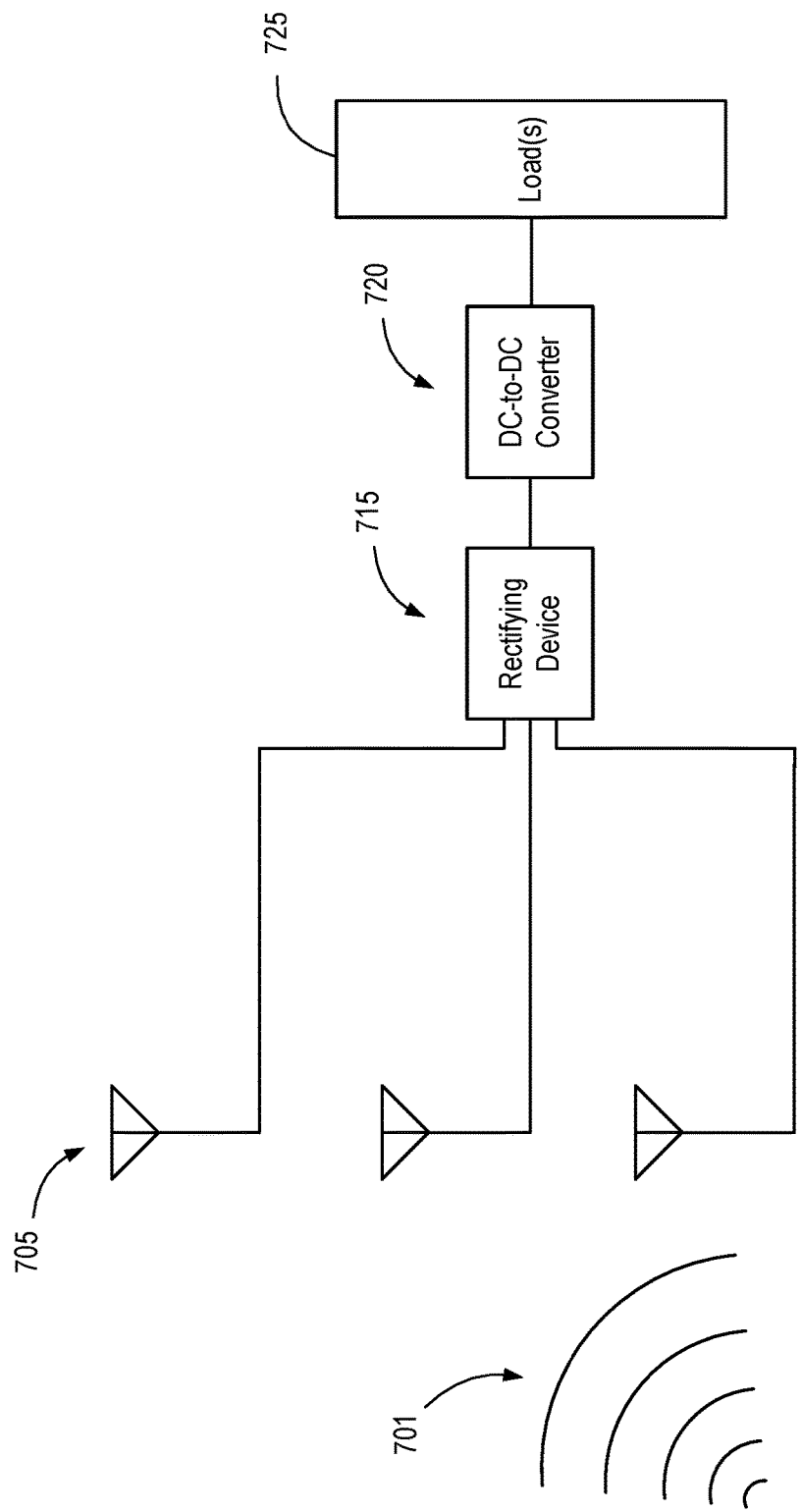
FIG. 7 illustrates another simplified block diagram of a wireless rectification system for converting EMR into DC power for consumption by a load, according to one embodiment.

FIG. 7 illustrates another simplified block diagram of another wireless rectification system for converting EMR 701 into DC power for consumption by one or more loads 725, according to one embodiment. A plurality of antennas 705 converts EMR 701, such as free-space EMR, to an AC current for conversion to DC power by the rectifying device 715. A DC-to-DC converter 720 may modify the DC power for delivery to the load(s) 725. Again, any of the various tunable multi-timescale wireless rectification systems, or combinations thereof, may be used to enhance the functionality of the wireless rectification system in FIG. 7.

Figure 8:
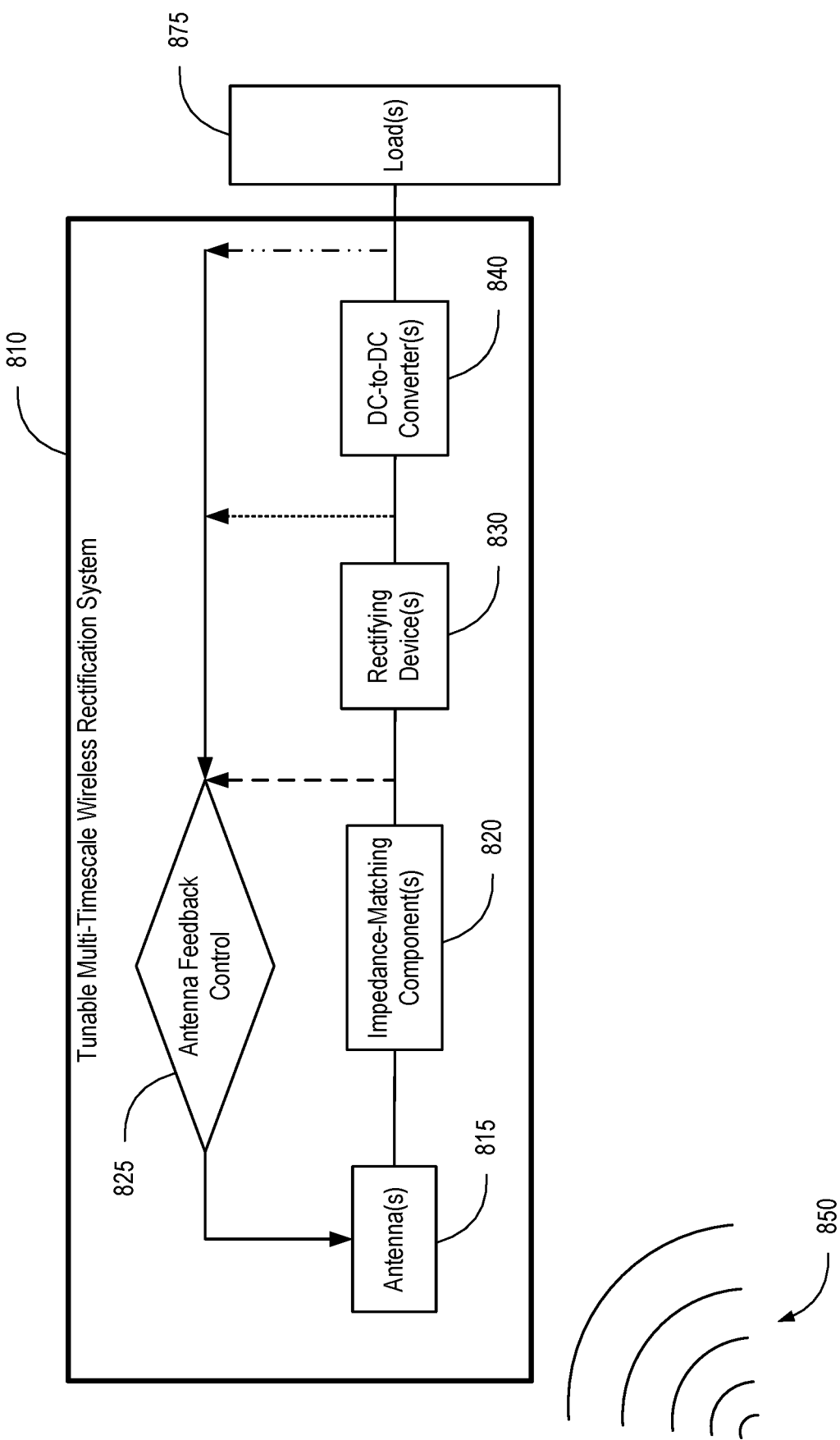
FIG. 8 illustrates a simplified block diagram of a feedback-controlled wireless rectification system for converting EMR into DC power for consumption by a load, according to another embodiment.

FIG. 8 illustrates a simplified block diagram of a feedback-controlled wireless rectification system 810 for converting EMR 850 into DC power for consumption by one or more loads 875, according to another embodiment. Any number of antennas 815 may receive EMR 850. The antennas 815 may function together as a beamforming array, or as individual receivers for receiving EMR from one or more transmitters. A number of impedance-matching components 820 may be less than, equal to, or more than the number of antennas 815. The impedance-matching components 820 may provide impedance matching of the antennas 815 to any number of rectifying devices 830. The number of rectifying devices 830 may be more than, less than, or equal to the number of antennas 815 and/or impedance-matching components 820. The rectifying devices 830 may deliver DC power to one or more DC-to-DC converters 840 for power delivery to the load 875.

The wireless rectification system 810 may be feedback-controlled in that a feedback circuit or feedback controller (antenna feedback control 825) may be responsive to a power characteristic of the AC power between the impedance-matching component(s) 820 and the rectifying device(s) 830, the DC power between the rectifying device(s) 830 and the DC-to-DC converter(s) 840, and/or the DC power delivered to the load(s) 875. For example, power may be considered to flow forward from the antenna(s) 815 to the impedance-matching component(s) 820, and on to the rectifying device(s) 830. In some instances, the power may be considered to flow backward from the impedance-matching component(s) 820 to the antenna(s) 815 and/or from the rectifying device(s) 830 to the impedance matching component(s) 820. The antenna feedback control 825 may be responsive to power flowing forward, backward, or in different directions between different elements at a given instant or during a time period.

In some instances, the frequency of the AC power flowing between the impedance-matching component(s) 820 and the rectifying device(s) 830 may be at the original frequency of the EMR 850 received by the antenna(s) 815. In other embodiments, the frequency may be at a harmonic of the frequency of the EMR 850 received by the antenna(s) 815. The antenna feedback control 825 may be responsive to, suppress, and/or otherwise harmonic power flow between the various elements depicted in FIG. 8, such as harmonics that may contribute to parasitic backscatter modulation.

The antenna feedback control 825 may, for example, operate to reduce, suppress, or modify harmonics generated by, for example, the rectifying device(s) 830, created or reflected by the load 875, by operation of the DC-DC converter(s) 840, or other reflected or created distortion to the primary power flow. The antenna feedback control 825, may operate to reduce, suppress, or otherwise modify harmonics generated by the antenna(s) 815, the impedance-matching component(s) 820, the rectifying device(s) 830, and/or the DC-to-DC converter 840, and/or the load 875.

The antenna feedback control 825 may tune or otherwise modify one or more characteristics of the antenna(s) 815. For example, the antenna feedback control 825 may control the shape, modify a resonance, modify a Q-factor, modify a dielectric constant, modify the impedance, modify a gain, modify a beam shape, and/or modify a physical attribute of one or more of the antennas 815.

The antenna feedback control 825 may be responsive to more than one monitored characteristic of the downstream power. In various embodiments, the antenna feedback control 825 may be responsive to multiple monitored characteristics on different timescales. For example, the antenna feedback control 825 may respond to changes in the AC power between the impedance-matching components 820 and the rectifying devices 830 on a microsecond or millisecond timescale. The antenna feedback control 825 may respond to changes in the DC power output of the rectifying devices 830, but on a slower timescale. Similarly, the antenna feedback control 825 may additionally or alternatively respond to measured characteristics of the DC power delivered to the load(s) 875 on an even timescale.

Figure 9:
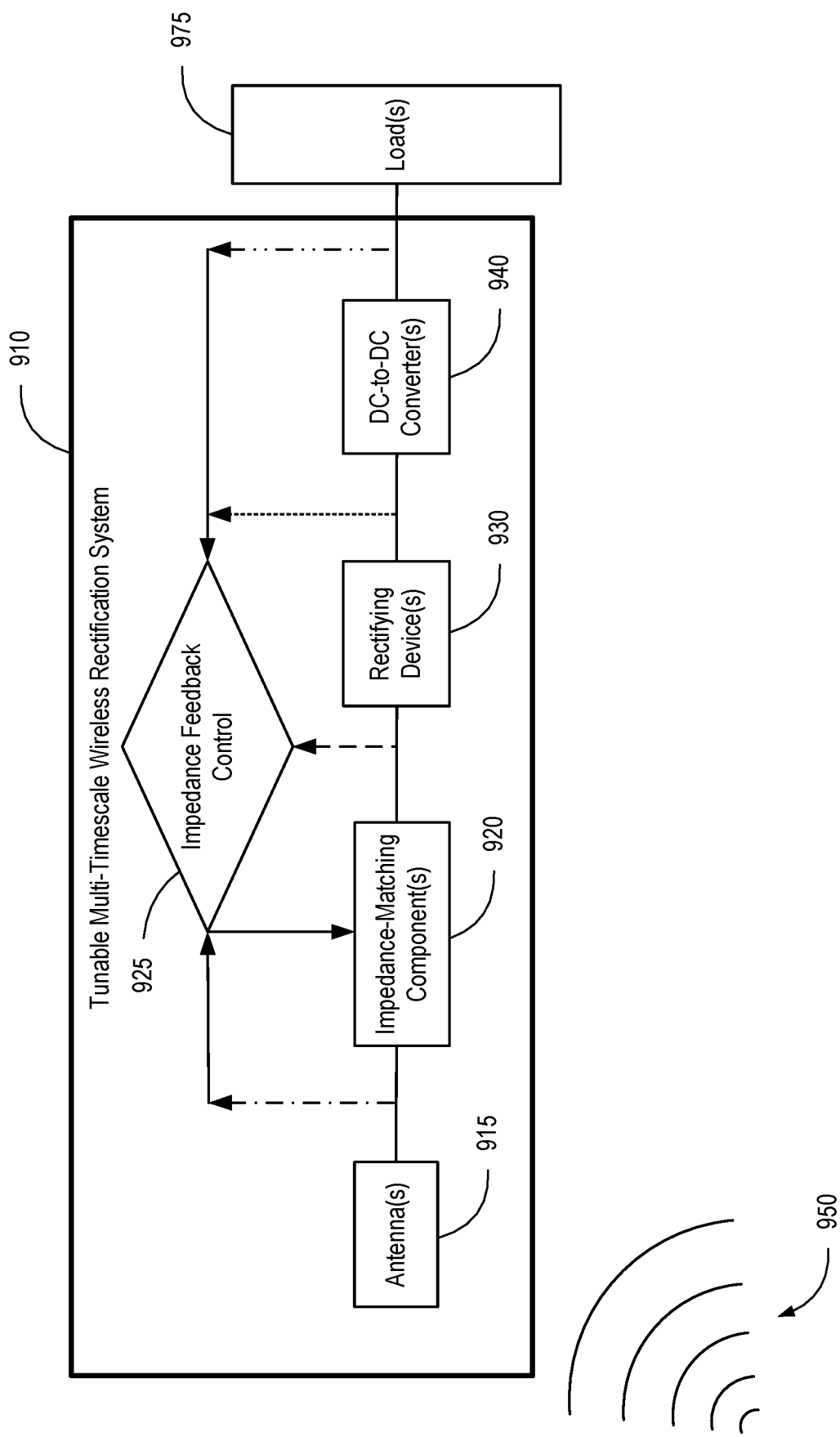
FIG. 9 illustrates a simplified block diagram of a feedback-controlled wireless rectification system for converting EMR into DC power for consumption by a load, according to another embodiment.

FIG. 9 illustrates a simplified block diagram of a feedback-controlled wireless rectification system 910 for converting EMR 950 into DC power for consumption by one or more loads 975, according to another embodiment. Any number of antennas 915 may receive EMR 950. A number of impedance-matching components 920 may provide impedance matching of the antenna(s) 915 to any number of rectifying devices 930. The rectifying device(s) 930 may deliver DC power to one or more DC-to-DC converters 940 for power delivery to the load(s) 975.

An impedance feedback control 925 may be responsive to a power characteristic of the AC power from the antennas 915 on a first timescale. The impedance feedback control 925 may additionally or alternatively be responsive to a power characteristic of the AC power between the impedance matching components 920 and the rectifying devices 930. The impedance feedback control 925 may be responsive to the DC power output of the rectifying device(s) 930 and/or the DC power delivered to the load(s) 975.

The impedance feedback control 925 may tune or otherwise modify one or more characteristics of the impedance-matching component(s) 920, as described herein. As in previous embodiments, the rectification system 910 may include any number of antennas 915, impedance-matching components 920, rectifying devices 930, and DC-to-DC converters 940. In some embodiments, impedance-matching components 920 and/or DC-to-DC converters 940 may be omitted. The tunable multi-timescale wireless rectification system 910 may include a plurality of impedance feedback controls 925. For example, the tunable multi-timescale wireless rectification system 910 may include a unique impedance feedback control 925 for each impedance-matching component 920. Each impedance feedback control 925 may be responsive to multiple measured characteristics or a single measured characteristic. The impedance feedback control 925 may be responsive to various measured characteristics on different timescales.

Figure 10:
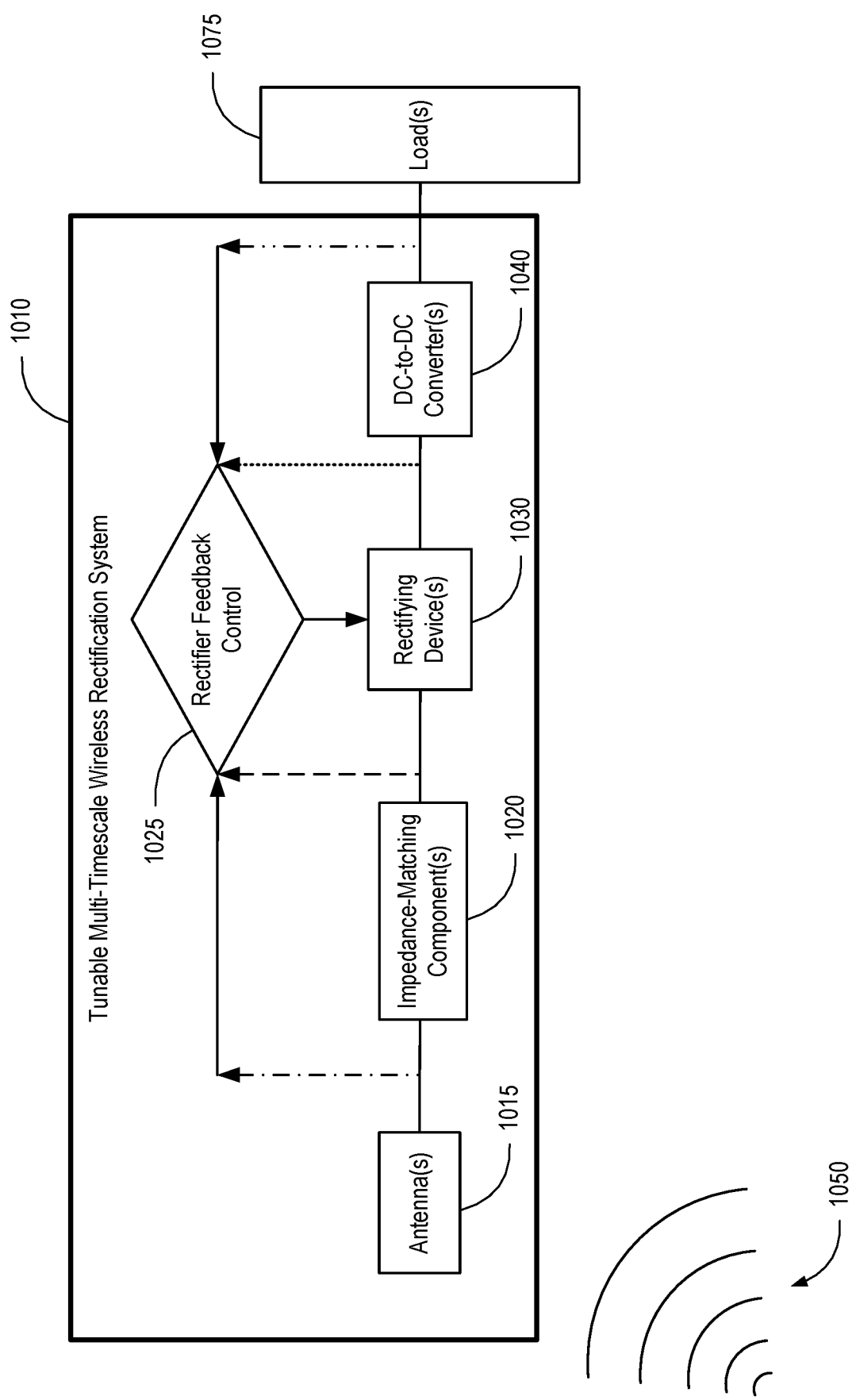
FIG. 10 illustrates a simplified block diagram of a feedback-controlled wireless rectification system for converting EMR into DC power for consumption by a load, according to another embodiment.

FIG. 10 illustrates a simplified block diagram of a feedback-controlled wireless rectification system 1010 for converting EMR 1050 into DC power for consumption by one or more loads 1075, according to another embodiment. As illustrated, a rectifier feedback control 1025 may be responsive to AC or DC power characteristics from various locations with the wireless rectification system. The rectifier feedback control 1025 may tune or modify the rectification of AC power to DC power by the rectifying device(s) 1030. For example, the rectifier feedback control 1025 may modify an input impedance of the rectifying device(s) 1030, an output impedance of the rectifying device(s) 1030, a voltage output of the rectifying device(s) 1030, a current of the rectifying device(s) 1030, or other output or input characteristic of the rectifying device(s) 1030.

The manner in which the rectifier feedback control 1025 modifies the rectifying device(s) 1030 may depend on which monitored location of the wireless rectification system 1010 the rectifier feedback control 1025 is responding to at a given time. The timescale of each response may vary, and the rectifier feedback control 1025 may include control logic to analyze and respond to some monitored power characteristics on a relatively slow timescale and discrete electronic components to respond to another monitored power characteristic on a very short (i.e., fast) timescale.

Figure 11:
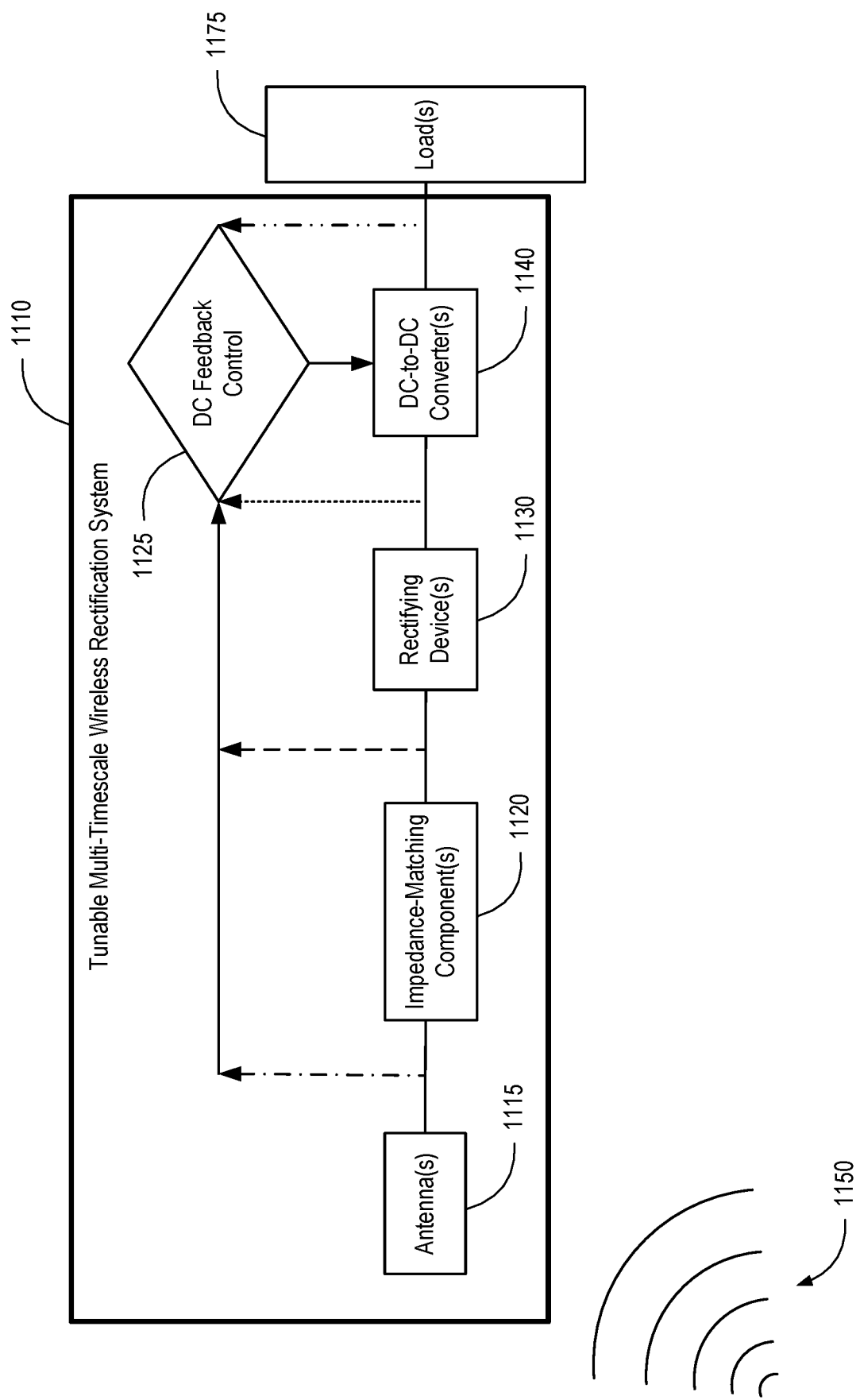
FIG. 11 illustrates a simplified block diagram of a feedback-controlled wireless rectification system for converting EMR into DC power for consumption by a load, according to another embodiment.

FIG. 11 illustrates a simplified block diagram of another feedback-controlled wireless rectification system 1110 for converting EMR 1150 into DC power for consumption by one or more loads 1175, according to another embodiment. FIG. 11 is similar to FIGS. 8-10, but includes a DC feedback control 1125 that modifies one or more characteristics of DC-to-DC converters 1140 in response to AC or DC characteristics at other locations within the wireless rectification system 1110 on various timescales. As in other embodiments, the tunable multi-timescale wireless rectification system 1110 may include a DC feedback control 1125 for each DC-to-DC converter 1140 in the rectification system. In other embodiments, a single DC feedback control 1125 circuit or controller may tune or otherwise control the output (or input impedance) of multiple DC-to-DC converters 1140.

Figure 12:
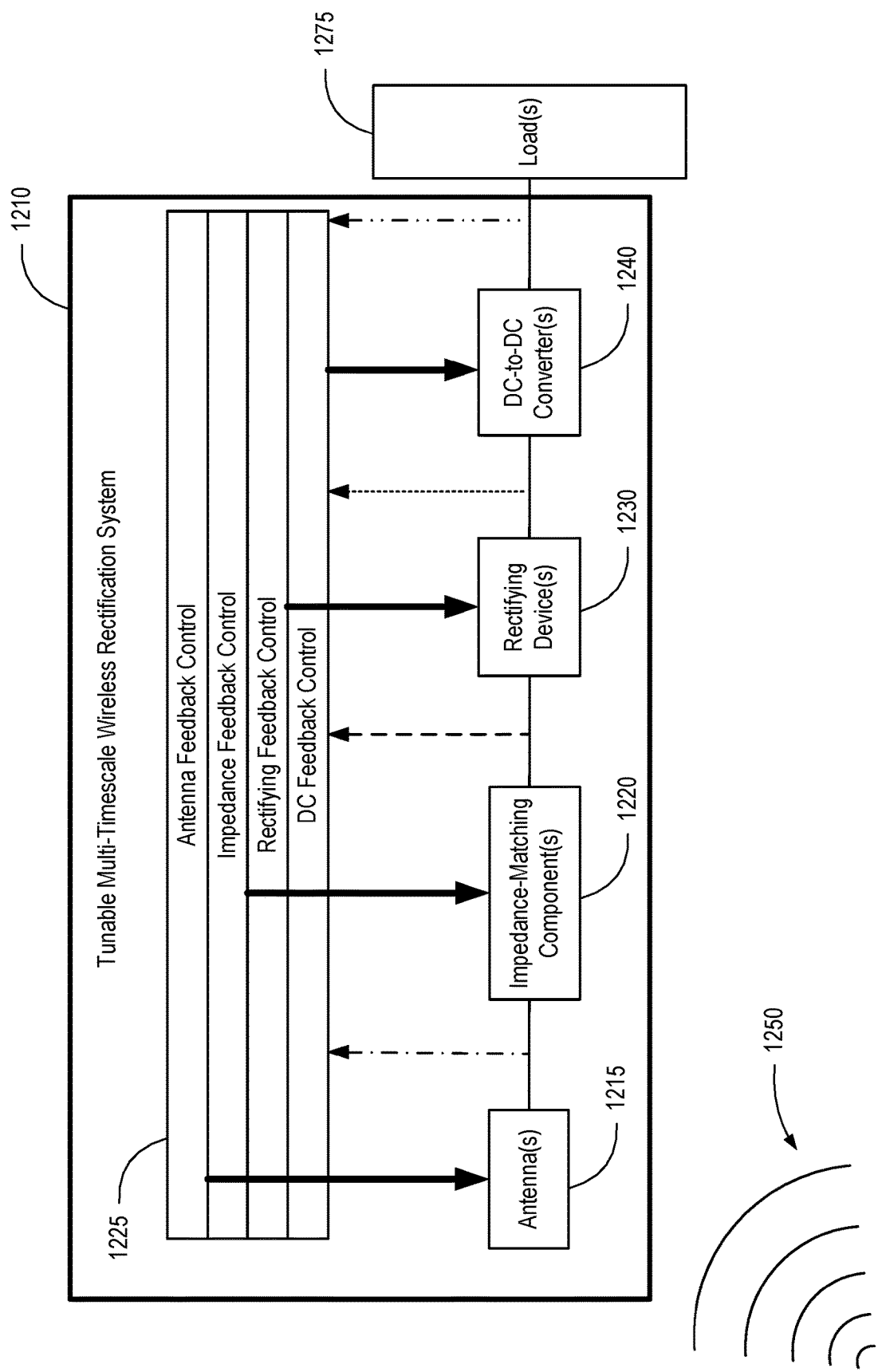
FIG. 12 illustrates a simplified block diagram of a feedback-controlled wireless rectification system for converting EMR into DC power for consumption by a load, according to another embodiment.

FIG. 12 illustrates a simplified block diagram of another feedback-controlled wireless rectification system 1210 for converting EMR 1250 into DC power for consumption by one or more loads 1275, according to another embodiment. The illustrated embodiment includes a multi-timescale feedback control 1225 that includes an antenna feedback control, an impedance feedback control, a rectifying feedback control, and a DC feedback control. The multi-timescale feedback control 1225 may provide control inputs to one or more antennas 1215, impedance matching components 1220, rectifying devices 1230, and/or DC-to-DC converters 1240. The control inputs may be provided on the same timescale, but may be responsive to inputs from various locations within the wireless rectification system 1210 on varying timescales.

In other embodiments, multi-timescale feedback control 1225 may be responsive to the various control inputs on the same timescale (e.g., via constant measurements), but control one or more of the antennas 1215, impedance-matching components 1220, rectifying devices 1230, and DC-to-DC converters 1240 on varying timescales. For example, the multi-timescale feedback control 1225 may modify characteristics of the antenna(s) 1215 on a first timescale, the impedance-matching component(s) 1220 on a second timescale, the rectifying device(s) 1230 on a third timescale, and the DC-to-DC converter(s) 1240 on a fourth timescale.

In some embodiments, the first, second, third, and fourth timescales may be different than one another. For example, each successively named timescale may be longer than the previous timescale. In other embodiments, a controller may allow for dynamic customization of each of the first, second, third, and fourth timescales. In still other embodiments, each of the first, second, third, and fourth timescales may be configured to have a static or quasi-static response time based on a particular application.

Figure 13:
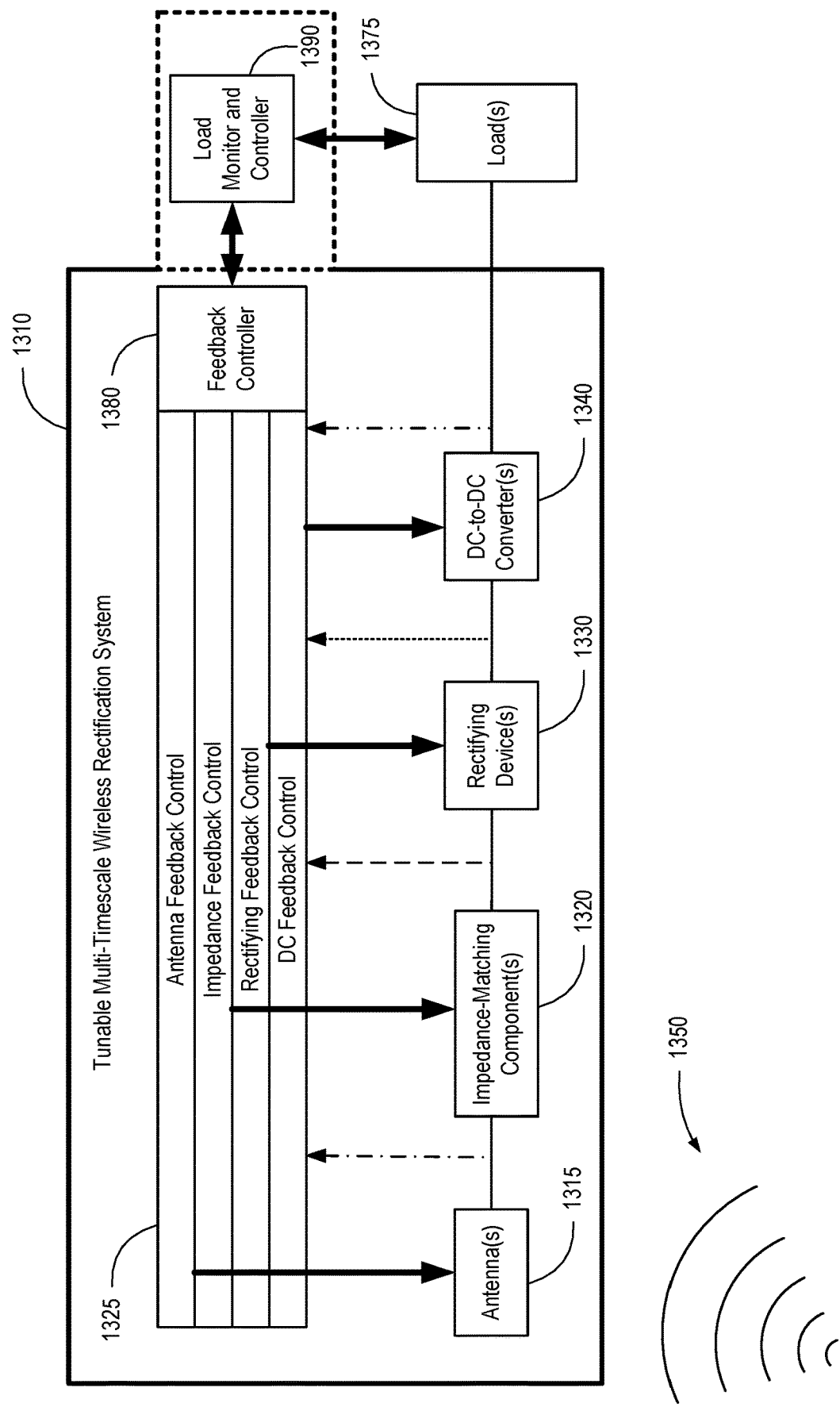
FIG. 13 illustrates a simplified block diagram of a tunable multi-timescale wireless rectification system for converting EMR into DC power for consumption by a load, according to another embodiment.

FIG. 13 illustrates a simplified block diagram of a tunable multi-timescale wireless rectification system 1310 similar to that of FIG. 12 for converting EMR 1350 into DC power for consumption by one or more loads 1375, according to another embodiment. In the illustrated embodiment, the tunable multi-timescale wireless rectification system 1310 further includes a feedback controller 1380 to control or dynamically modify the feedback controls sent to the antenna(s) 1315, the impedance-matching component(s) 1320, the rectifying device(s) 1330, and the DC-to-DC converter(s) 1340. The feedback controller 1380 may include or be in communication with a load monitor and controller 1390.

The load monitor and controller 1390 may be responsive to the feedback controller 1380 based on measured power characteristics of AC power between the antenna(s) 1315 and the impedance-matching component(s) 1320, or between the impedance-matching component(s) 1320 and the rectifying device(s) 1330. The load monitor and controller 1390 may be responsive to the measured AC or DC power at various locations relative to the antenna(s) 1315, impedance-matching component(s), 1320, rectifying device(s) 1330, and/or DC-to-DC converter(s) 1340.

Optionally, the load monitor and controller 1390 may be responsive on a different timescale from the various multi-timescale feedback controls 1325. The load monitor and controller 1390 may dynamically shed or add load(s) 1375 based on measured power characteristics. The load monitor and controller 1390, for example, may direct a UAV to decrease power consumption based on feedback controls indicating that less power may be available in the immediate future. In some embodiments, the load monitor and controller 1390 may direct power into and out of storage devices to compensate for excess energy or energy shortages.

Figure 14A:
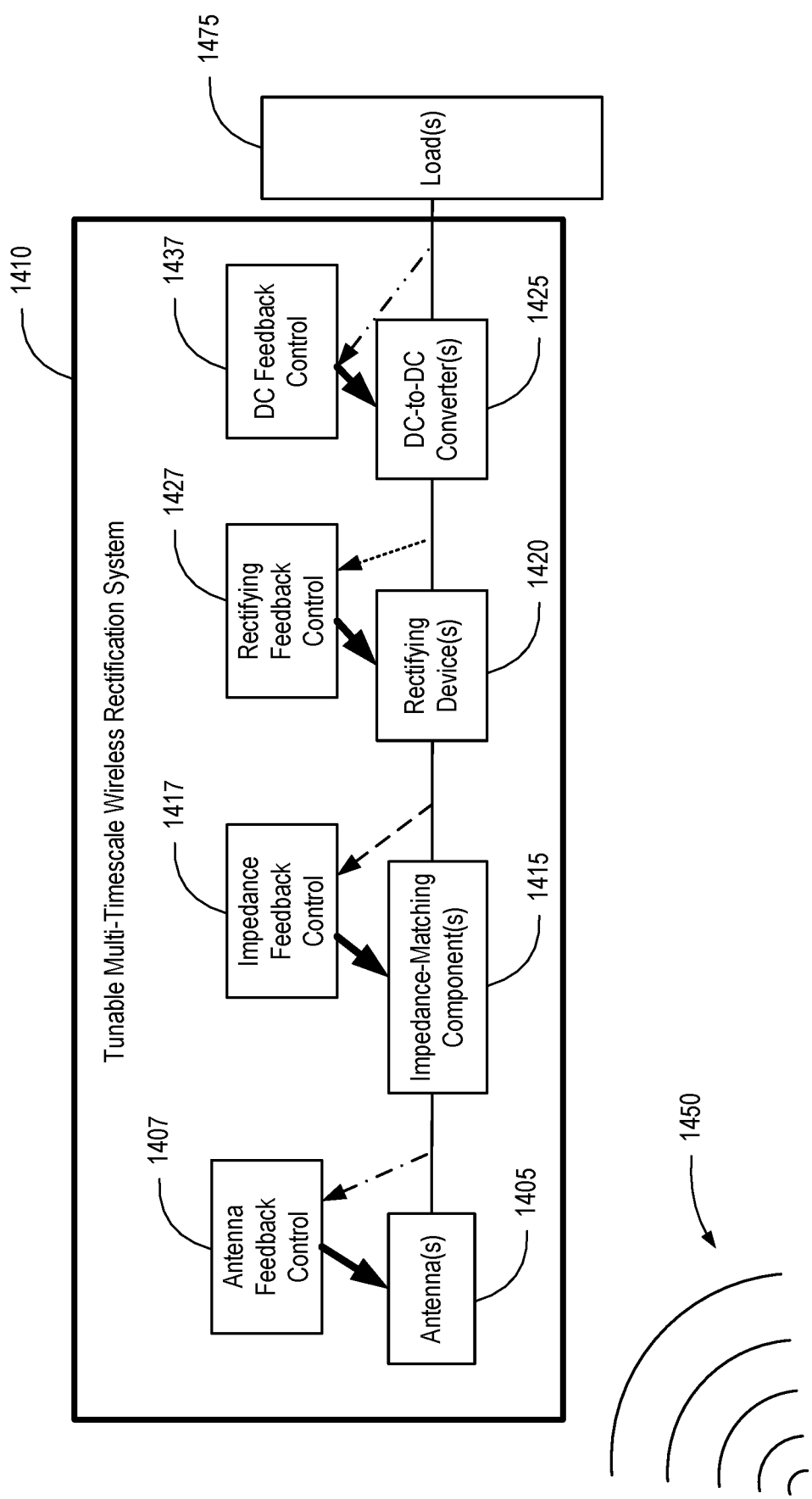
FIG. 14A illustrates another simplified block diagram of a tunable multi-timescale wireless rectification system, according to one embodiment.

FIG. 14A illustrates another simplified block diagram of a tunable multi-timescale wireless rectification system 1410, according to one embodiment. In the illustrated embodiment, free-space EMR 1450 is received by antenna(s) 1405. Impedance-matching component(s) 1415 convey AC power from the antenna(s) 1405 to rectifying devices 1420. The rectifying devices 1420 convert the AC power into DC power for delivery to, in some embodiments, DC-to-DC converters 1425. The DC-to-DC converters 1425 convey DC power to the load(s) 1475. As previously described, the load(s) 1475 may include various consuming devices and/or energy storage devices.

The tunable multi-timescale wireless rectification system 1410 may include one, two, three, or all four of the illustrated feedback controls. Specifically, the tunable multi-timescale wireless rectification system 1410 may include an antenna feedback control 1407, an impedance feedback control 1417, a rectifying feedback control 1427, and/or a DC feedback control 1437. In the illustrated embodiment, the antenna feedback control 1407 may modify a characteristic of one or more of the antennas 1405 in response to measured output values of one or more of the antennas 1405 on a first timescale. The impedance feedback control 1417 may modify a characteristic of one or more off the impedance-matching components 1415 based on output values of one or more of the impedance-matching components 1415 on a second timescale. The rectifying feedback control 1427 may modify a characteristic of one or more rectifying devices 1420 based on output values of one or more of the rectifying devices 1420 on a third timescale. The DC feedback control 1437 may modify a characteristic of one or more DC-to-DC converters 1425 based on output values of one or more of the DC-to-DC converters 1425 and/or consumption characteristics of the load(s) 1475. The first, second, third, and fourth timescales may be slightly different from one another or may be different by orders of magnitude.

Figure 14B:
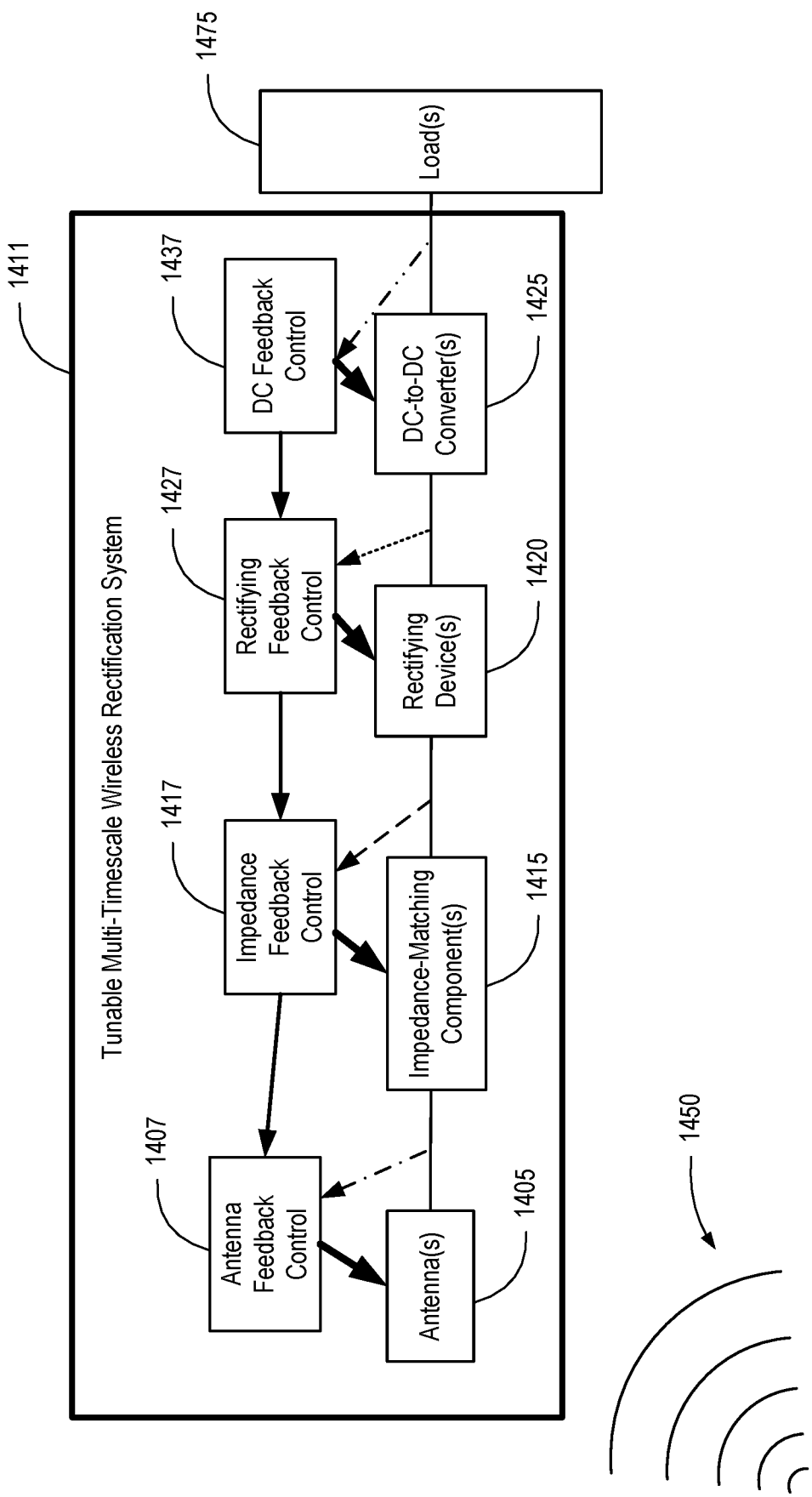
FIG. 14B illustrates another simplified block diagram of a tunable multi-timescale wireless rectification system, according to one embodiment.

FIG. 14B illustrates another simplified block diagram of a tunable multi-timescale wireless rectification system 1411, according to one embodiment. As compared to FIG. 14A, the tunable multi-timescale wireless rectification system 1411 includes multiple feedback controls in communication with one another. Thus, the embodiment in FIG. 14B, includes an antenna feedback control 1407 that may modify a characteristic of one or more of the antennas 1405 in response to measured output values of one or more of the antennas 1405 on a first timescale and/or measured values from the outputs of the impedance-matching component(s) 1415, rectifying device(s) 1420, and/or DC-to-DC converter(s) 1425 on various different timescales.

The impedance feedback control 1417 may modify a characteristic of one or more of the impedance-matching components 1415 based on output values of one or more of the impedance-matching components 1415 on a second timescale and/or measured downstream values of the outputs of the rectifying device(s) 1420 and/or the DC-to-DC converter(s) 1425 on various other timescales.

The rectifying feedback control 1427 may modify a characteristic of one or more rectifying devices 1420 based on output values of one or more of the rectifying devices 1420 on a third timescale and/or the output of the DC-to-DC converter 1425 outputs on a different timescale.

Figure 14C:
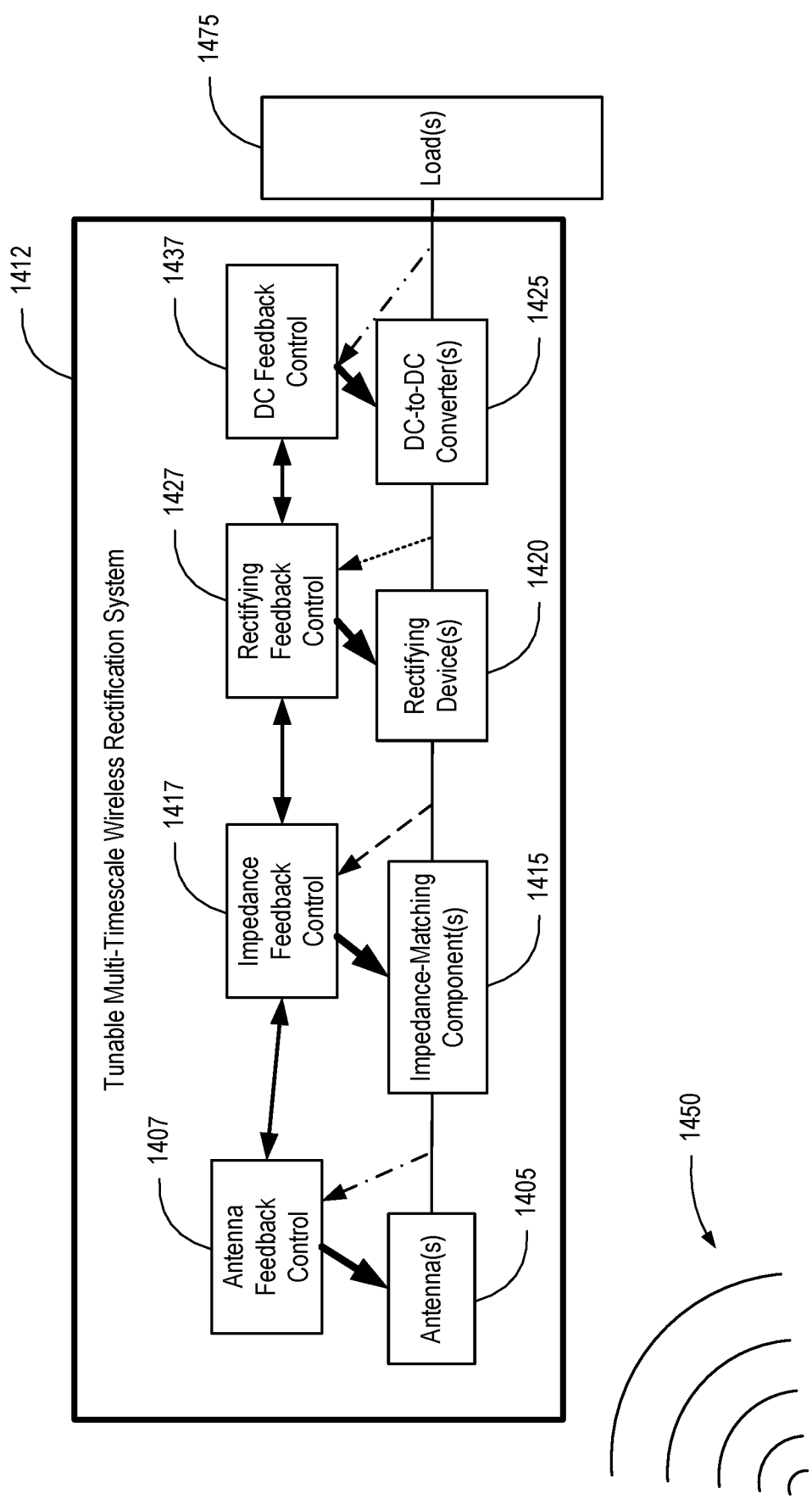
FIG. 14C illustrates another simplified block diagram of a tunable multi-timescale wireless rectification system, according to one embodiment.

FIG. 14C illustrates another simplified block diagram of a tunable multi-timescale wireless rectification system 1412, according to another embodiment. In the illustrated embodiment, each of the feedback controls includes bi-directional communication to allow for each feedback control to control a component of the wireless rectification system 1412 on various timescales in response to one or more power or impedance characteristics at one or more locations along the rectification path.

Figure 14D:
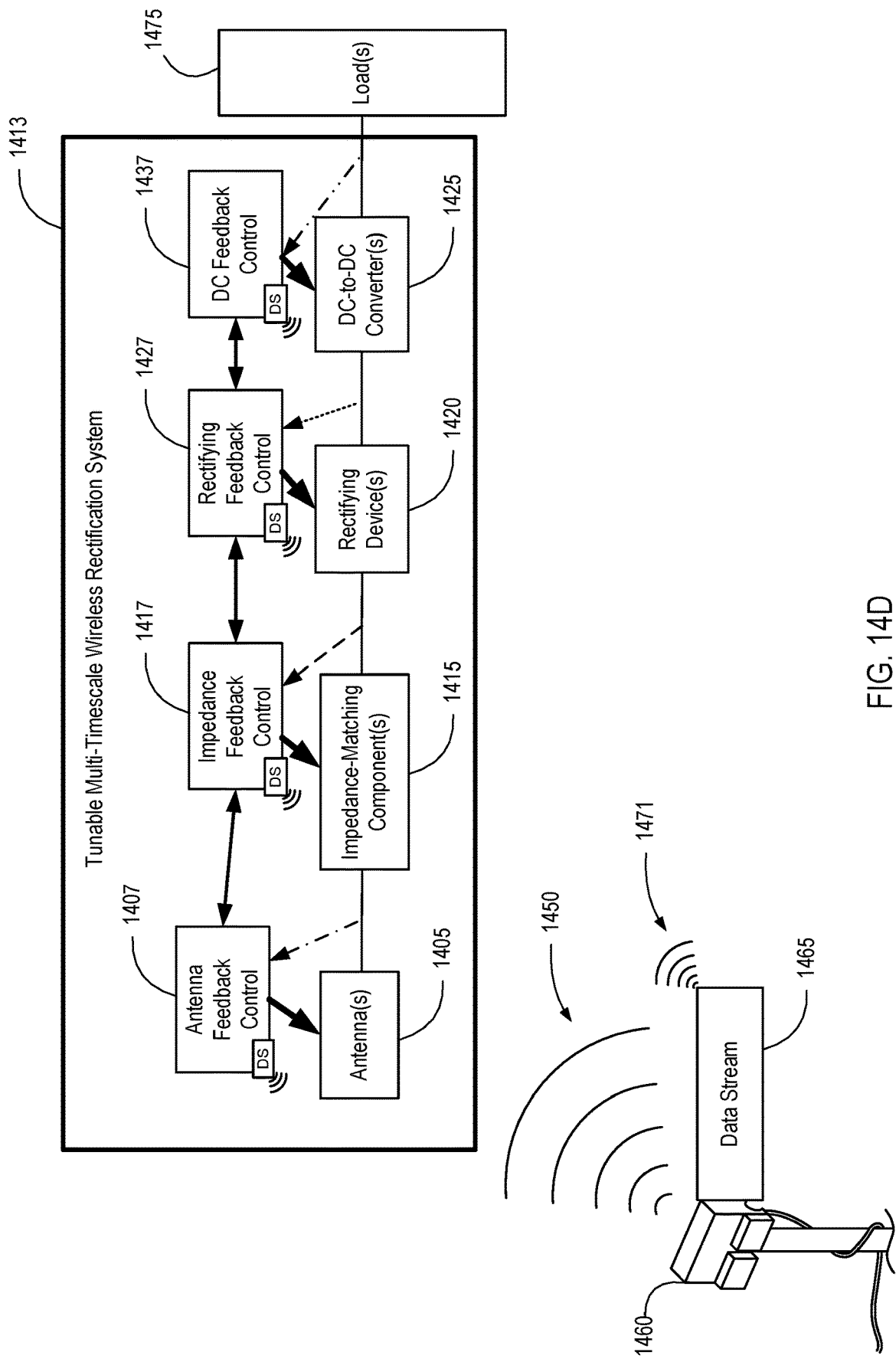
FIG. 14D illustrates another simplified block diagram of a tunable multi-timescale wireless rectification system, according to one embodiment.

FIG. 14D illustrates another simplified block diagram of a tunable multi-timescale wireless rectification system 1413, according to yet another embodiment. In the illustrated embodiment, the tunable multi-timescale wireless rectification system 1413 may include one or more of the feedback controls that may be further responsive to a data stream (shown as a DS box) received from a wireless power transmitter 1460 that transmits both the wireless power signal 1450 and a data stream signal 1471 from a data stream component 1465. The data stream signal 1471 may be out-of-band relative to the wireless power signal 1450.

As an example, the data stream signal 1471 may provide an indication to the antenna feedback control 1407 that the wireless power signal 1450 will switch frequencies at a prescribed time. The antenna feedback control 1407 may respond to this information on a suitable timescale to modify a tuning, matching, Q-factor, beam shape, frequency response, resonance, physical shape, impedance, and/or another antenna characteristic. In some embodiments, the data stream signal 1471 may contain information indicating an expected increase or decrease in available power. The various feedback controls (1407, 1417, 1427, and/or 1437) may respond to the expected change in available power by modifying characteristics of the antenna(s) 1405, impedance-matching component(s) 1415, rectifying device(s) 1420, and/or DC-to-DC converter(s) 1425.

In some embodiments, the data stream signal 1471 may provide instructions to adjust the time scales of one or more of the feedback controls 1407, 1417, 1427, and/or 1437. For example, the wireless rectification system 1413 may be apprised of potential future instability of the power signal 1450. The feedback controls may be responsive to this information from the data stream signal 1471 by increasing the speed of the feedback control loops to more quickly adjust to the expected, less stable power signal 1450.

In some embodiments, the wireless power transmitter 1460 may communicate a data stream signal 1471 with a load monitor and/or controller, such as the load monitor and controller 1390 in FIG. 13, to modify usage and/or storage characteristics of the load. A similar load monitor and/or controller may be configured to function in conjunction with the tunable multi-timescale wireless rectification system 1413.

Figure 15:
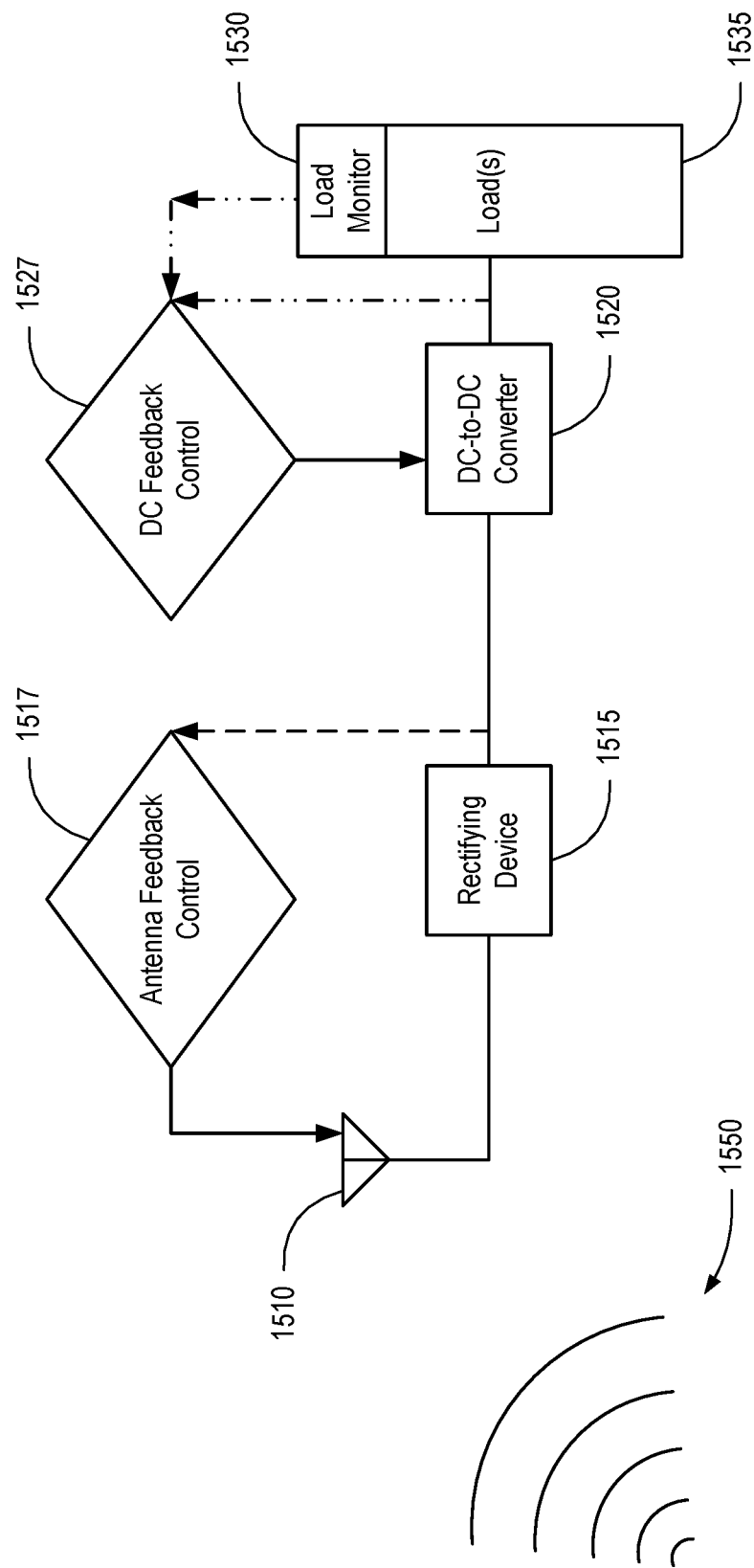
FIG. 15 illustrates another simplified block diagram of a tunable multi-timescale wireless rectification system, according to one embodiment.

FIG. 15 illustrates a more simplified block diagram of a tunable multi-timescale wireless rectification system that includes an antenna feedback control 1517 and a DC feedback control 1527. As illustrated, an antenna 1510 may receive EMR 1550 and convert the received EMR 1550 into an AC current. The AC current may be received by a rectifying device 1515 for conversion to a DC current. The antenna feedback control 1517 may be responsive, on a first timescale, to a measured characteristic of the DC power (e.g., a voltage, current, or total power output of the rectifying device 1515). The antenna feedback control 1517 may modify a characteristic of the antenna 1510 based on the measured characteristic of the DC power.

A DC-to-DC converter 1520 may modify the DC power delivered from the rectifying device 1515 to the load(s) 1535. A DC feedback control 1527 may control or modify the functionality of the DC-to-DC converter 1520 based on a monitored output of the DC-to-DC converter 1520 and/or information from a load monitor 1530. For example, a load monitor 1530 may monitor the immediate power consumption of the load(s) 1535, determine a future power consumption by the load(s) 1535, control the power consumption of the load(s) 1535, and/or otherwise be able to communicate load information. The DC feedback control 1527 may utilize the load information to modify the DC-to-DC converter 1520 on a second timescale. The first timescale may be an order of magnitude shorter than the second timescale. For example, the antenna feedback control 1517 may modify characteristics of the antenna 1510 on a tens-of-milliseconds timescale, while the DC feedback control 1527 may modify characteristics of the DC-to-DC converter 1520 on a hundreds-of-milliseconds timescale.

Figure 16:
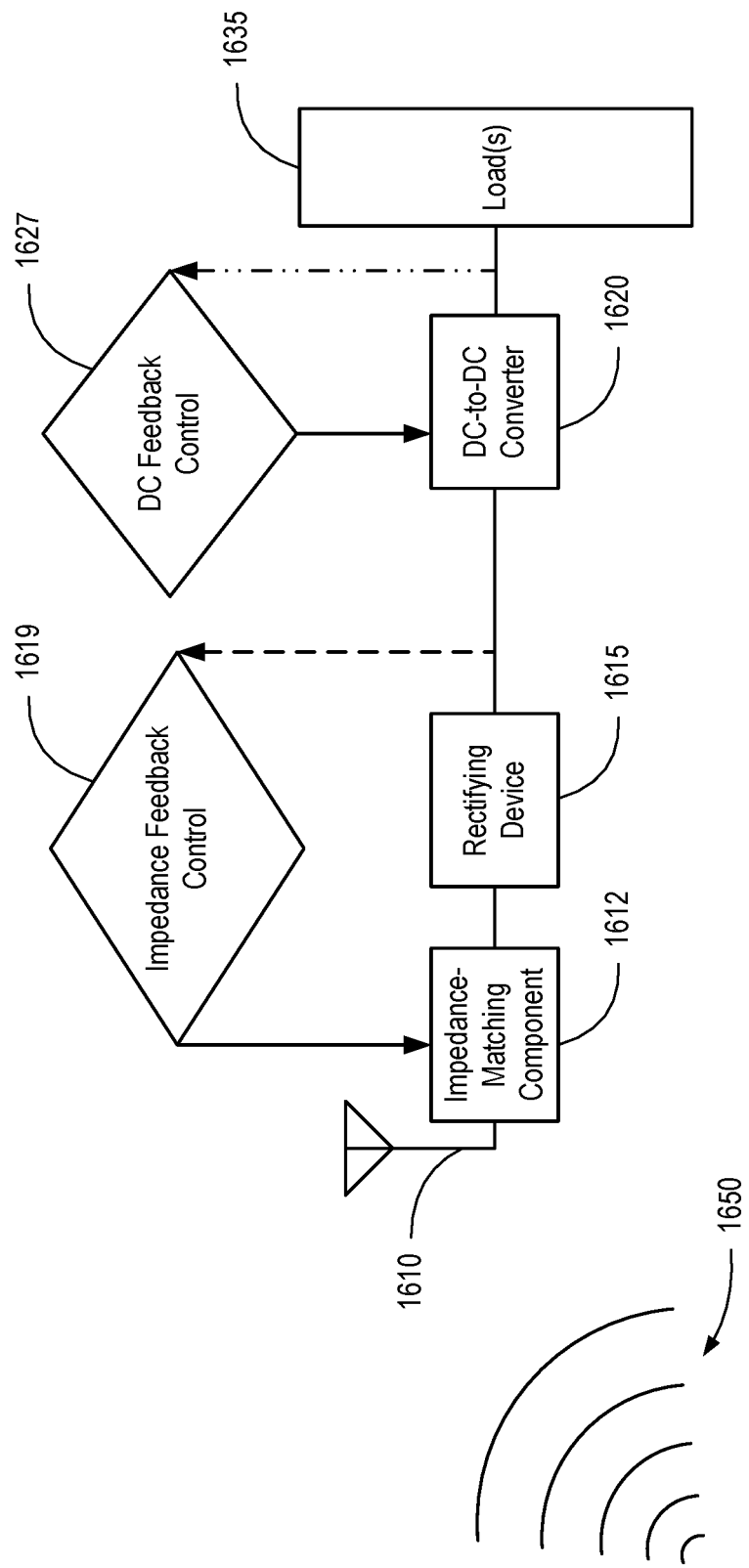
FIG. 16 illustrates another simplified block diagram of a tunable multi-timescale wireless rectification system, according to one embodiment.

FIG. 16 illustrates another simplified block diagram of a tunable multi-timescale wireless rectification system, according to another embodiment. In the illustrated embodiment, an antenna 1610 receives EMR 1650, such as free-space EMR from a wireless transmitter. An impedance-matching component 1612 may provide impedance matching between the antenna 1610 and a rectifying device 1615. The rectifying device 1615 may convert AC power from the antenna 1610 to DC power. The DC power may be modified by a DC-to-DC converter 1620 for delivery to one or more load(s) 1635.

The system 1600 may include any number of antennas 1610, impedance-matching components 1612, rectifying devices 1615, and DC-to-DC converters 1620. An impedance feedback control 1619 and a DC feedback control 1627 may modify characteristics of the impedance-matching component 1612 and the DC-to-DC converter 1620, respectively. The impedance feedback control 1619 and the DC feedback control 1627 may operate on different timescales.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. This disclosure should, therefore, be determined to encompass at least the following claims.

What is claimed is:

1. A tunable multi-timescale wireless rectification system, comprising:
an antenna to receive electromagnetic radiation;
a rectifying device to produce a DC power output;
an impedance-matching component to couple the antenna to the rectifying device;
a DC-to-DC converter to couple the rectifying device to a load;
a first feedback control that operates on a first timescale to modify AC power delivered from the antennas to the rectifying devices by modifying a characteristic of the antennas;
a second feedback control that operates on a second timescale to modify DC power delivered from the rectifying devices to the load by modifying a characteristic of the rectifying devices;
a third feedback control that operates on a third timescale to further modify AC power delivered from the antennas to the rectifying devices by modifying impedances of the impedance-matching components; and
a fourth feedback control that operates on a fourth timescale to modify a DC power characteristic of power delivered from the rectifying devices to the load.

2. The system of claim 1, further comprising DC-to-DC converters responsive to the fourth feedback control to modify the DC power characteristic of power delivered from the rectifying devices to the load.

3. The system of claim 1, wherein the load comprises:
a propulsion system;
a sensor; and
a processor to control operation of the propulsion system and the sensor.

4. A tunable multi-timescale wireless rectification system, comprising:
a plurality of antennas to receive electromagnetic radiation;
a plurality of rectifying devices to produce DC power outputs;
a plurality of impedance-matching components to couple each of the antennas to at least one of the rectifying devices;
a plurality of DC-to-DC converters to couple the rectifying devices to a load;
a first feedback control associated with at least one of (i) the antennas and (ii) the impedance-matching components to modify AC power delivered from the antennas to the rectifying devices on a first timescale; and
a second feedback control associated with the DC-to-DC converters to modify DC power delivered from the rectifying devices to the load on a second timescale.

5. The system of claim 4, further comprising a third feedback control associated with the rectifying devices to modify DC power delivered from the rectifying devices to the load on a third timescale.

6. The system of claim 4, wherein the first feedback control is associated with the impedance-matching components to modify a characteristic of the impedance-matching components on the first timescale that results in a modification to the AC power provided to the rectifying devices.

7. The system of claim 4, wherein the second feedback control is associated with the rectifying devices to operate on the second timescale to modify a characteristic of the rectifying devices that results in a modification to the DC power delivered from the rectifying devices to the load.

8. The system of claim 4, further comprising a DC conversion feedback control associated with the DC-to-DC converters to operate on a third timescale to modify a characteristic of the DC-to-DC converters that results in a second modification to the DC power delivered from the rectifying devices to the load.

9. The system of claim 4, further comprising a controller to coordinate the first feedback control on the first timescale and the second feedback control on the second timescale to optimize power conversion efficiency.

10. The system of claim 4, further comprising a controller to coordinate the first feedback control on the first timescale and the second feedback control on the second timescale to control temperature hotspots exceeding a predetermined maximum temperature value.

11. The system of claim 4, wherein the second feedback control is associated with the DC-to-DC converters to operate on the second timescale to modify a characteristic of the DC-to-DC converters that results in a modification to the DC power delivered from the rectifying devices to the load.

12. The system of claim 11, wherein the first feedback control is associated with the antennas to operate on the first timescale to modify a characteristic of the antennas that results in a modification to the AC power provided to the rectifying devices; and further comprising a rectification feedback control associated with the rectifying devices to operate on a third timescale to modify a characteristic of the rectifying devices that results in a second modification to the DC power delivered from the rectifying devices to the load.

13. A multi-timescale rectification optimization and protection system, comprising:

an impedance-matching component to electrically connect an antenna and a rectifying device of a wireless power rectification system, wherein the impedance-matching component is responsive to a first feedback control to modify AC power delivered to the rectifying device by the antenna on a first timescale; and a DC-to-DC converter to electrically connect the rectifying device to a load, wherein the DC-to-DC converter is responsive to a second feedback control to modify DC power delivered to the load by the rectifying device on a second timescale, wherein the first timescale of the first feedback control is at least an order of magnitude faster than the second timescale of the second feedback control.

14. The system of claim 13, wherein the first feedback control is an inherent feedback characteristic of the impedance-matching component.

15. The system of claim 13, wherein the impedance-matching component is configured to limit AC power throughput below a maximum value by reflecting power back to the antenna that exceeds the maximum value.

16. The system of claim 13, wherein the DC-to-DC converter is part of a maximum power point tracking (MPPT) controller responsive to the second feedback control.

17. The system of claim 16, wherein the second feedback control comprises at least one analog feedback loop to dynamically adjust at least one of (i) an input impedance of the MPPT controller and (ii) an output impedance of the MPPT controller.

18. The system of claim 17, wherein the second feedback control comprises a first analog feedback loop to dynamically adjust the input impedance of the MPPT controller and a second analog feedback loop to dynamically adjust the output impedance of the MPPT controller.

19. A method for providing wireless power to a target device, comprising:

converting, via a plurality of antennas, received electromagnetic radiation into AC power;

modifying, via impedance-matching components, the AC power from the antennas based on an impedance-match feedback control operating on a first timescale;

rectifying, via rectifying devices, the modified AC power from the impedance-matching components to produce DC power outputs to a load;

adjusting a bias voltage of at least one of the rectifying devices based on a bias feedback control operating on a second timescale to modify at least one of the DC power outputs of at least one of the rectifying devices.

20. The method of claim 19, further comprising coordinating, via a controller, the impedance-match feedback control on the first timescale and the bias-feedback control on the second timescale.

21. The method of claim 19, wherein the impedance-matching components comprise tunable circuits responsive to the first feedback control provided by an analog feedback signal to limit AC power throughput below a maximum value.

22. The method of claim 21, wherein the tunable circuits comprise tunable metamaterial devices.

23. The method of claim 19, wherein the impedance-matching components are configured to reflect AC power returned from rectifying devices back to the rectifying devices.

24. The method of claim 23, wherein the impedance-matching components comprise adaptive components.

25. The method of claim 24, further comprising tuning the adaptive components on a third timescale based on a reflection feedback control signal.

26. The method of claim 19, wherein at least some of the rectifying devices comprise transistors.

27. The method of claim 19, further comprising modifying, via a controller, power output of the rectification system on a third timescale that is slower than the first and second timescales.

28. The method of claim 27, further comprising communicating with a remote transmitter to increase or decrease power transmission to the plurality of antennas.

29. The method of claim 28, further comprising communicating with the remote transmitter via reflected portions of the incoming power signal.

30. A method for providing wireless power to a target device, comprising:

converting, via a plurality of antennas, received electromagnetic radiation into AC power;

modifying, via impedance-matching components, the AC power from the antennas based on an impedance-match feedback control operating on a first timescale;

rectifying, via rectifying devices, the modified AC power from the impedance-matching components to produce DC power outputs; and modifying, via DC-to-DC converters, the DC power outputs of the rectifying devices based on a conversion feedback control operating on a second timescale that is different than the first timescale.

31. The method of claim 30, wherein the DC-to-DC converters are embodied as part of at least one MPPT controller responsive to the conversion feedback control.

32. The method of claim 31, wherein the conversion feedback control associated with each MPPT controller comprises at least one analog feedback loop to dynamically adapt at least one of (i) an input impedance of the MPPT controller and (ii) an output impedance of the MPPT controller.

33. The method of claim 30, further comprising combining the DC power outputs of the rectifying devices via a plurality of DC power combiners.

* * * * *